United States Patent [19]

Isfeld et al.

[11] Patent Number: 5,828,835
[45] Date of Patent: Oct. 27, 1998

[54] HIGH THROUGHPUT MESSAGE PASSING PROCESS USING LATENCY AND RELIABILITY CLASSES

[75] Inventors: Mark S. Isfeld, San Jose; Tracy D. Mallory, Palo Alto; Bruce W. Mitchell, San Jose; Michael J. Seaman, Mountain View; Nagaraj Arunkumar, San Jose; Pyda Srisuresh, Milpitas, all of Calif.

[73] Assignee: 3Com Corporation, Santa Clara, Calif.

[21] Appl. No.: 675,663

[22] Filed: Jul. 3, 1996

Related U.S. Application Data

[63] Continuation-in-part of Ser. No. 599,473, Jan. 23, 1996, Pat. No. 5,802,278, which is a continuation-in-part of Ser. No. 438,897, May 10, 1995, Pat. No. 5,592,622.

[51] Int. Cl.$^6$ ...................................................... G06F 13/00
[52] U.S. Cl. ................................. 395/200.3; 395/200.13; 395/200.65; 395/200.62; 395/877; 395/309
[58] Field of Search ............................ 395/200.3, 200.1, 395/200.15, 680, 200.7, 800, 200.01, 200.02; 340/506; 370/463

[56] References Cited

U.S. PATENT DOCUMENTS

| | | | |
|---|---|---|---|
| 4,475,155 | 10/1984 | Oishi et al. | 395/842 |
| 4,543,627 | 9/1985 | Schwab | 395/200.2 |
| 4,644,532 | 2/1987 | George et al. | 370/255 |
| 4,783,730 | 11/1988 | Fischer | 395/825 |
| 4,860,244 | 8/1989 | Bruckert et al. | 364/926.1 |
| 4,912,723 | 3/1990 | Verbanets, Jr. | 375/220 |
| 4,962,497 | 10/1990 | Ferenc et al. | 370/354 |
| 5,039,980 | 8/1991 | Aggers et al. | 340/506 |
| 5,088,090 | 2/1992 | Yacoby | 370/402 |
| 5,088,091 | 2/1992 | Schroeder et al. | 370/406 |
| 5,093,824 | 3/1992 | Coan et al. | 370/228 |
| 5,109,484 | 4/1992 | Hughes et al. | 395/200.52 |
| 5,121,383 | 6/1992 | Golestani | 370/235 |

(List continued on next page.)

FOREIGN PATENT DOCUMENTS

WO 94/08415 4/1994 WIPO.

OTHER PUBLICATIONS

Choi, et al., "Integrating Networks and Memory Hierarchies in a Multicomputer Node Architecture," IEEE, pp. 10–17, (1994).

*Primary Examiner*—Tod R. Swann
*Assistant Examiner*—Fred F. Tzeng
*Attorney, Agent, or Firm*—Mark A. Haynes; Wilson, Sonsini, Goodrich & Rosati

[57] ABSTRACT

A communication technique for high volume connectionless-protocol, backbone communication links in distributed processing systems provides for control of latency and reliability of messages transmitted. The system provides for transmit list and receive list processes in the processors on the link. On the transmit side, a high priority command list and a normal priority command list are provided. In the message passing process, the command transmit function transmits commands across the backplane according to a queue priority rule that allows for control of transmit latency. Messages that require low latency are written into the high priority transmit list, while a majority of messages are written into the high throughput or normal priority transmit list. A receive filtering process in the receiving processor includes dispatch logic which dispatches messages either to a high priority receive list or a normal priority receive list. The filtering function also acts to drop messages received according to the amount of available buffer space in the receiving processor, as measured against watermarks based on reliability tags in message headers. The messages received are routed to either the high priority receive list or a normal priority receive list based on another control bit in the message headers. The receiving processor processes the messages in the receive queues according to a priority rule that allows for control of the latency between receipt of a message, and actual processing of the message by the receiving processor.

57 Claims, 24 Drawing Sheets

U.S. PATENT DOCUMENTS

| | | | |
|---|---|---|---|
| 5,131,081 | 7/1992 | MacKenna et al. | 395/842 |
| 5,134,691 | 7/1992 | Elms | 395/200.39 |
| 5,175,732 | 12/1992 | Hendel et al. | 370/463 |
| 5,195,181 | 3/1993 | Bryant et al. | 395/200.1 |
| 5,218,676 | 6/1993 | Ben-Ayed et al. | 395/200.15 |
| 5,230,051 | 7/1993 | Quan | 395/680 |
| 5,255,387 | 10/1993 | Arnold et al. | 711/121 |
| 5,276,899 | 1/1994 | Neches | 395/200.7 |
| 5,335,325 | 8/1994 | Frank et al. | 711/103 |
| 5,379,296 | 1/1995 | Johnson et al. | 370/402 |
| 5,404,524 | 4/1995 | Celi, Jr. | 395/652 |
| 5,404,562 | 4/1995 | Heller et al. | 395/800 |
| 5,426,637 | 6/1995 | Derby et al. | 370/401 |
| 5,469,548 | 11/1995 | Callison et al. | 711/114 |
| 5,485,455 | 1/1996 | Dobbins et al. | 370/255 |
| 5,521,910 | 5/1996 | Matthews | 370/256 |
| 5,592,622 | 1/1997 | Isfeld et al. | 395/200.02 |
| 5,617,537 | 4/1997 | Yamada et al. | 395/200.01 |

| transfer type | MSG XMIT | SMEM WRITE | SMA READ | SMEM READ | MEM MOVE | CELL XMIT | MSG RCV | CBIO & CBMEM WRITE | CB READ | PROMIS-CUOUS RCV |
|---|---|---|---|---|---|---|---|---|---|---|
| source addr a | SDRAM | SDRAM | SMEM | SMEM | SDRAM | SDRAM | other card | 29030 | explicit (mem/io) | other card |
| dest addr b | MSG | SMEM | MSG (channel) | SDRAM | SDRAM | explicit msg addr | MSG (channel) | explicit (mem/io) | 29030 | any CB addr, filtered |
| direction wrtIOM | outbound | outbound | inbound | inbound | loopback (not CB) | outbound (loop?) | inbound | outbound | inbound | inbound |
| origin of cycle | command list | command list | command list | command list | command list | command list | other card | command list | command list | any CB cycle |
| receive activity | n/a | n/a | rcv buff free list | move to SDRAM | move to SDRAM | varies | rcv buff free list | n/a | move to SDRAM | move to SDRAM |
| data buffering | packing cell buff | packing cell buff | packing cell buff | packing cell buff | packing cell buff | packing cell buff | inbound cell buff | embed-ded in cmd list | packing cell buffer | inbound cell buff |
| align & pack | yes | yes | yes | yes | yes | no | no | no | no | no |

Corebus Data Transfers

FIG.9

Command List Bit Definiton (Non-Message)

| IMS Message Type | Minimum Latency Requirement | Minimum Reliability Requirement | Frequency of occurrence on IOS/IOP -Avg.Peak (Msgs/Sec) | IMS Message Queue | IMS drop priority |
|---|---|---|---|---|---|
| Internal Remote function calls | High | Very High | 20, 40 | HRQ | Guaranteed Delivery |
| IOP Management (e.g. statistics) | High | High | 5, 30 | HRQ | Guaranteed Delivery |
| IOS/IOP control messages (e.g. cache-query, intra-box msgs) | Low | Very High | 20, 200 | HRQ | 1(Low drop probability) |
| Critical Network Control Pkts (e.g.IS-IS LSPs, STP Pkts) | Medium | High | 10, 50 | HRQ | 2 |
| Other Network Control Pkts (e.g. ES-IS hellos, IPX SAPs) | Medium | Medium | 10, 100 | HRQ | 3(High drop probability) |
| IOP-IOP Data pkts for a IOP-distributed protocol | Medium | Low-Med | 10k, 50k | HTQ | 1(Low drop probability) |
| IOP-IOM Data pkts for a IOP-distributed protocol | Medium | Low-Med | 5k, 50k | HTQ | 2 |
| IOP-CEC centralized protocol data packets | Medium | Low-Med | 5k, 50k | HTQ | 3 |
| IOP-external distributed protocol exception packets | High | Low | 10, 500 | HTQ | 4 |
| Transit Multicast packets | High | Lower | 20, 1000 | HTQ | 5(High drop probability) |

FIG. 21

HIGH THROUGHPUT MESSAGE PASSING PROCESS USING LATENCY AND RELIABILITY CLASSES

RELATED APPLICATION DATA

This application is a continuation-in-part of prior filed U.S. application Ser. No. 08/599,473, entitled BRIDGE/ROUTER ARCHITECTURE FOR HIGH PERFORMANCE SCALABLE NETWORKING, filed 23 Jan. 1996 now U.S. Pat. No. 5,802,278; which is a continuation-in-part of prior filed U.S. application Ser. No. 08/438,897, entitled NETWORK INTERMEDIATE SYSTEM WITH MESSAGE PASSING ARCHITECTURE, filed 10 May 1995, now U.S. Pat. No. 5,592,622 both of which are incorporated by reference as if fully set forth herein.

BACKGROUND OF THE INVENTION

1. Field of the Invention

The present invention relates to high performance data communication systems, including communication techniques for distributed processing architectures; and particularly to communication backbones for bridge/routers that supply transparent communication between a variety of types of network interfaces, integrating such local area network standards as Token Ring, Ethernet, FDDI, and ATM, and also supporting wide area links.

2. Description of Related Art

A router is an internetworking device that chooses between multiple paths when sending data, particularly when the paths available span a multitude of types of local area and wide area interfaces. Routers are best used for (1) selecting the most efficient path between any two locations; (2) automatically re-routing around failures; (3) solving broadcast and security problems; and (4) establishing and administering organizational domains. One class of router, often called bridge/routers or Brouters, also implements switching functionality, such as transparent bridging and the like. One commercially available example of such system is known as NETBuilder II, provided by 3Com Corporation of Santa Clara, Calif.

Because bridge/routers are designed to interconnect a variety of networks, the volume of data flow through the router can be very high. The ability to move large amounts of data, according to a wide variety of networking protocols, makes the bridge/router a unique class of high performance data processing engines.

The time consumed in communication among distributed processing nodes in bridge/router systems, and in other high performance data processing systems, often limits the amount of data that can be processed in the systems. Thus, distributed processing nodes are often interconnected by high speed buses, and the like, to optimize interprocessor communication in such systems. Some distributed processing environments interconnect the processing nodes by local area networks or wide area network links, which are much slower. However, the same efficiency concerns arise in these environments.

In a communication link between processing nodes, two kinds of messages are typically transmitted. The first type act as control messages, involved in maintaining the communication link, in controlling the multi-processor functions, and for other purposes which are unrelated to data throughput. The other class of messages consist of raw data. In high volume systems like bridge/routers the movement of raw data is the critical parameter. Thus, it is desirable to limit the amount of control messages transmitted on the communication link among the distributed processing nodes in order to enhance data throughput.

One technique for limiting the amount of control messages which is in wide spread use, is to rely on so called connectionless protocols. In a connectionless protocol, a sender transmits a message on the communication link without first establishing a connection with the destination. This creates the possibility of the destination may not be in a condition to receive the packet, in which case the packet is lost. Statistically, these kinds of systems can result in high throughput communication links, with very good reliability. However, for some classes of message, the likelihood that it may be dropped in a connectionless type communication system is unacceptable. For example, in a bridge/router system, the standard reliability of a connectionless backbone communication system may be insufficient for certain control messages that relate to the functioning of the elements of the distributed bridge/router system. Thus, backbone communication links among high performance processing engines, particularly in distributing processing environments, have usually been based on connection oriented communication protocols. This way, before a message is sent, it can be guaranteed that the destination processor is ready to receive and process the message.

However, in the connection oriented communication protocol, there is a significant overhead just in establishing the connection for the message, which does not contribute to the mission of the system.

Accordingly, it is desirable to provide a communication protocol for a multi-processor system, which optimizes bandwidth utilization on the back plane communication link.

SUMMARY OF THE INVENTION

The present invention provides a connectionless communication protocol, which enhances the reliability and control over latency of the processing of messages based on classifying messages according to latency and reliability classes. Thus, according to the present invention, the transmission of messages among processing nodes in an interprocessor system is managed to control transmit latency, that is the amount of time between Tie posting of a message to be transmitted at a source processor, and actual transmission of that message on the communication link; transmit reliability, that is the desired level of reliability required for a source processor that a command to transmit a message will actually be executed; receive reliability, that is the desired level of reliability required for a destination processor to actually receive a message transmitted from a source processor; and receive latency, that is the amount of time between actually receiving a message, and processing such message at the destination processor.

Thus, according to one aspect of the invention, it can be characterized as a method of transferring data on a communication medium from a source processor to a destination processor, wherein the data includes messages of a first transmit latency class and messages of a second transmit latency class. According to this aspect, messages of a first transmit latency class are queued at the source processor in a first transmit queue, and messages of the second transmit latency class are queued at the source processor in a second transmit queue. The first and second transmit queues operate to send messages on the communication link according to respective priority rules, such as a first-in first-out rules. According to this invention, a particular message selected from the first and second transmit queues in the source processor is sent on a communication link according to a queue priority rule to the destination processor without establishing connection with the destination processor for the particular message in advance. The queue priority rule provides, in one embodiment of the invention, for sending messages in the second transmit queue prior to sending any message in the first transmit queue, so long as a message resides in the second transmit queue. Other queue priority rules may be implemented, to ensure fairness or other parameters of a particular system. Thus, a source processor is able to classify messages according to a transmit latency class, to ensure that certain classes of messages are transmitted quickly onto the communication link, while other classes of messages are handled in a best efforts type process.

According to another aspect of the invention, the step of queuing messages involves storing commands in either the first or second transmit queue. The commands identify the messages to be transferred across the communication medium. In order to send a message, the commands are created by the source processor. Further, the messages may include one or more fragments of data, such as an encapsulation header and an encapsulated frame. The commands are created by the source processor in a manner such that one command is stored for each fragment of the message to be transmitted. Furthermore, the commands will include pointers to, or otherwise be associated with, memory locations in the source processor where the messages or fragments to be transferred are stored. Optionally, the commands indicate the destination addresses for messages to be transferred. The fragments of a message are gathered for transmission in response to the commands, and may be segmented into cells for transmission, the cells having a data length which is specified according to characteristics of the communication medium in the preferred system.

An additional level of reliability queuing is provided according to another aspect of the invention by "quality of service" thresholds in the first or second transmit queues. According to the quality of service thresholds, the commands are classified according to command types. When storing commands into the first or second transmit queue, commands having a first type are dropped or returned to the sender, if a first threshold number of entries in the transmit queue data structure has been exceeded. Commands of a second type are written into the transmit queue if any entries are available. This way, software in the source processor is able to provide an additional level of reliability for certain classes of messages.

According to another aspect of the invention, a code in the messages (or cells making up the messages) being transmitted is provided at the source processor which indicates one of a first and second reliability classes for the message. Preferably, a third reliability class is utilized as well. As the messages are received to destination processor, the reliability class of the message is determined. Messages are stored in the destination processor memory according to a received priority rule which provides for storing messages of the first reliability class if a first threshold amount of storage is available in the destination processor for such messages, and storing messages of the second reliability class if a second threshold amount of storage is available in the destination processor memory. The use of these receive priority rules act to preserve buffer space in destination processors for receiving high reliability messages.

According to yet another aspect of the invention, a code in messages being transmitted on the communication medium is provided to indicate one of first and second receive latency classes. As the messages are received at the destination processor, the receive latency class is determined, and the message is queued in one of the first and second receive queues according to the receive latency class. The messages are processed at the destination processor from the first and second receive queues according to a receive queue priority rule. For instance, all messages of a first receive latency class in the first receive queue will be processed prior to processing messages in the second receive queue which have the second receive latency class.

According to one approach to management of destination processor memory, a plurality of receive buffers is maintained in the destination processor memory. In addition, a list of free receive buffers is kept by the destination processor. The step of storing received messages involves loading the data of a received message into a free receive buffer which is identified by the list of free receive buffers. According to this aspect of the invention, the receive priority rule provides for dropping messages in the first reliability class if the list of free receive buffers indicates that less than the first threshold amount of storage is available in the receive buffers. Messages of the second reliability class are dropped if the list of free receive buffers indicates that less than the second threshold amount of storage is available. The receive priority rule preferably includes a rule for dropping messages of a third reliability class if no receive buffers are available in the destination processor memory.

Thus, a source processor is able to classify messages to be transmitted on the connectionless communication link according to transmit latency classifications, receive reliability classifications, and receive latency classifications. This greatly improves the control over message throughput in a communication backbone, along with reliability and latency of messages.

According to another aspect of the invention, the communication process based on latency and reliability classes discussed above is applied to a bridge/router system with multiple processors connected by a backbone communication link. As frames of data are received at the bridge/router from connected networks, they are processed in the receiving processor, and transmitted across the communication link based on classifications as discussed above. The communication link can be any type of connectionless protocol system, such as a high speed parallel or serial bus which executes a connectionless protocol, a local area network link, or even an internet protocol cloud. Also, the communication link may comprise a LAN or WAN protocol link used as a backplane bus within a single chassis, executing for example, asynchronous transfer mode ATM, high speed Ethernet, or fiber optic based protocols like FDDI.

Accordingly, the present invention provides a technique for improving the control over latency and reliability of messages transmitted using connectionless protocols. The invention is suited particularly to distributed processing systems, where the technique provides very efficient utilization of communication links between processors, while providing significant reliability and control over latency of the messages being transmitted.

Other aspects and advantages of the present invention can be seen upon review of the figures, the detailed description, and the claims which follow.

BRIEF DESCRIPTION OF THE FIGURES

FIG. 9 is a table setting forth the data transfer types in the system of FIG. 1.

FIG. 21 is a table showing the interprocessor messaging system message types and their priorities according to one implementation of the present invention.

DETAILED DESCRIPTION

A detailed description of an embodiment of the present invention is provided with reference to the figures. FIGS. 1–5 illustrate a basic hardware environment for the system applied as a network intermediate system. FIGS. 6–17 illustrate the message transfer hardware and techniques applied according to the present invention in the environment of FIG. 1.

FIGS. 18 through 28 illustrate the processing resources and the logical layered interprocessor messaging system used over the physical layer.

Figure 29:
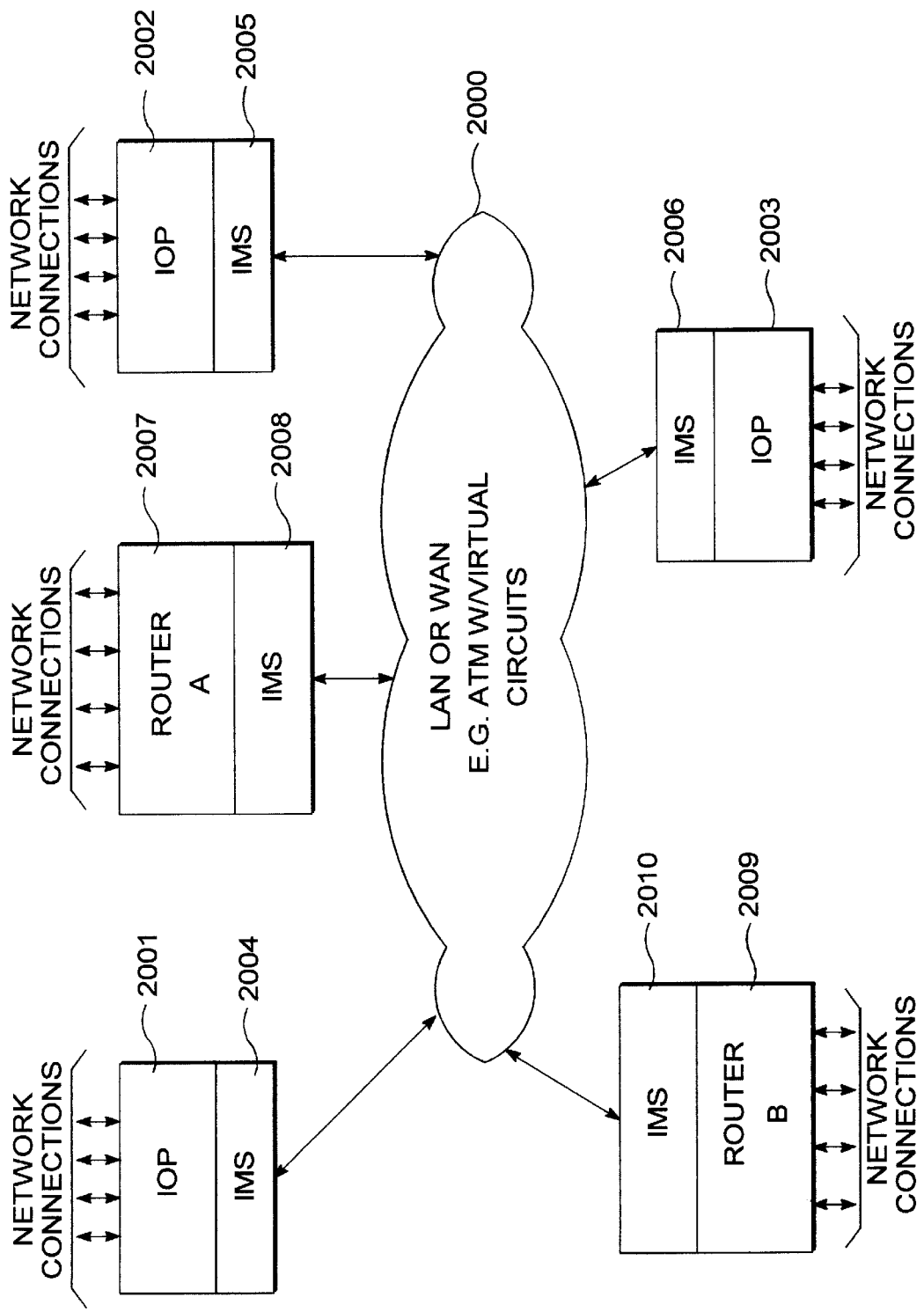
FIG. 29 illustrates application of the scalable architecture across a LAN or WAN backbone.

FIG. 29 shows use of the message passing architecture using latency and reliability classes with a LAN or WAN backbone.

I. SYSTEM DESCRIPTION

Figure 1:
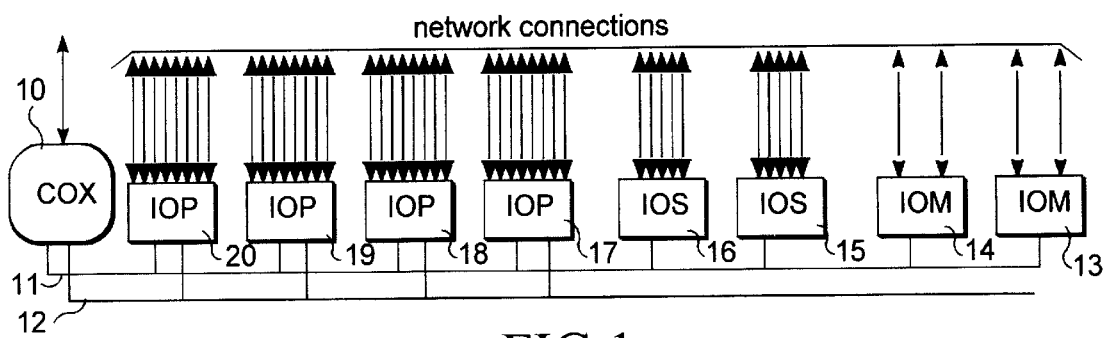
FIG. 1 provides a system block diagram for a scalable network intermediate system according to the present invention.

FIG. 1 provides a board level block diagram of a scalable bridge/router illustrating the present invention. The bridge/router includes a central control card COX 10 coupled to a first high speed parallel bus 11 and a second high speed parallel bus 12. A plurality of input/output (I/O) modules are coupled to the bus 11 to provide input/output functions for connected networks. The plurality of I/O modules includes in the embodiment described a first relatively passive type interface device IOM 13 and 14, an intermediate level semi-intelligent processing device IOS 15 and 16, and a more powerful processing system IOP 17, 18, 19, and 20. The IOP boxes 17–20 include interfaces to both high speed buses 11 and 12.

Each of the plurality of processors has at least one associated network connection. Thus, the IOM boxes 13 and 14 include two network connections each, which might be coupled to, for instance, Ethernet or token ring local area networks. The IOS boxes 15 and 16 include five connections each, coupling to local area networks (LANs), such as Ethernet, FDDI, token ring, or the like and/or wide area networks (WAN) links. The IOP boxes 17–20 have eight network connections each and handle much higher throughputs.

Figure 2:
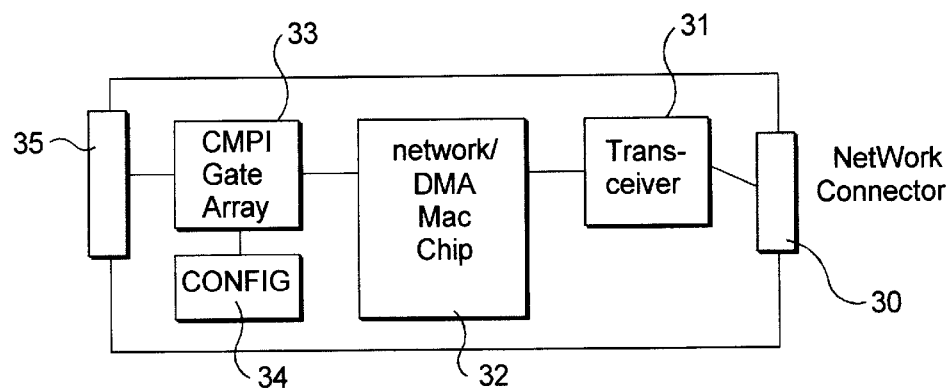
FIG. 2 provides a block diagram of a basic input/output module (IOM) which may be used in the system of FIG. 1.

The basic IOM box 13 is illustrated in FIG. 2. It includes at least one network connector 30 which is coupled to a transceiver 31 and a network/DMA MAC chip 32, such as commercially available for a given type of network. This chip is coupled to a bus interface chip 33 with associated configuration data 34, and through the interface chip 33 to a backplane bus connection 35. The IOM box shown in FIG. 2 relies primarily on the central control box COX 10 for the management of data transfer and control functions.

The bus interface chip 33 is described in detail in our co-pending U.S. patent application entitled INPUT/OUTPUT BUS ARCHITECTURE WITH PARALLEL ARBITRATION, application Ser. No. 08/033,008, filed Feb. 26, 1993, invented by Mark Isfeld, et al. Such application is incorporated by reference as if fully set forth herein to fully provide a detailed description of the bus architecture in the preferred system. However, this particular bus architecture is not intended to be limiting. The preferred system uses a 32 bit (or greater) wide bus with a least a 25 MHz clock and preferably a 50 MHz clock, for a nominal data rate of 800 MBPS (megabits per second) or 1600 MBPS. Even higher data rates can be achieved with state of the art high speed parallel bus architecture, or other data transfer techniques. Also, the backplane may be implemented using a variety of local area network technologies as discussed below with reference to FIG. 35.

Figure 3:
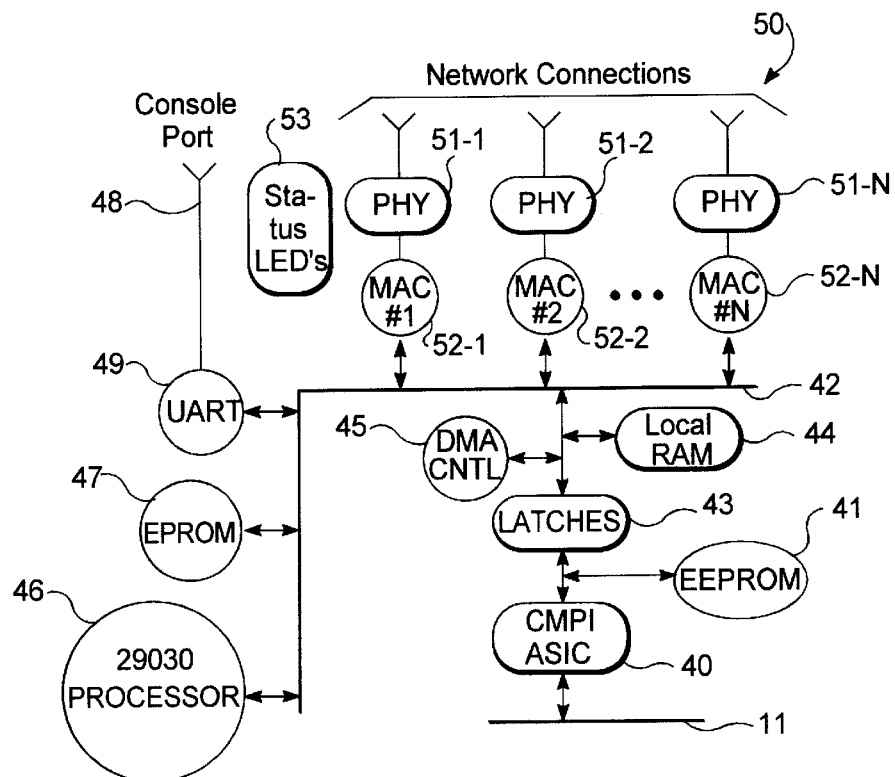
FIG. 3 provides a block diagram of a semi-intelligent I/O module (IOS) such as used in the system of FIG. 1.

The semi-intelligent I/O processor IOS, 15 and 16, is illustrated in FIG. 3. As can be seen, this system is connected to the bus 11 through the bus interface chip 40. A non-volatile memory device 41, such as an EEPROM, stores configuration data and the like for the bus interface 40. A data interface to an intermediate bus 42 is provided through latches 43. Also, a local memory 44 and a DMA control module 45 are coupled to the intermediate bus 42 and the local memory 44. An intelligent microprocessor 46, such as the Am29030 manufactured by Advanced Micro Devices, Inc., is coupled to the intermediate bus 42. A flash programmable read only memory 47 provides storage for programs executed by the processor 46. A console port 48 is provided through a UART interface 49 to the bus 42. A plurality of network connections, generally 50, are coupled to the bus 42 through respective physical interfaces 50-1 through 51-N, and medium access control MAC devices 52-1 through 52-N. The box may include status light emitting diodes 53 connected and controlled as desired by the particular user.

Figure 4:
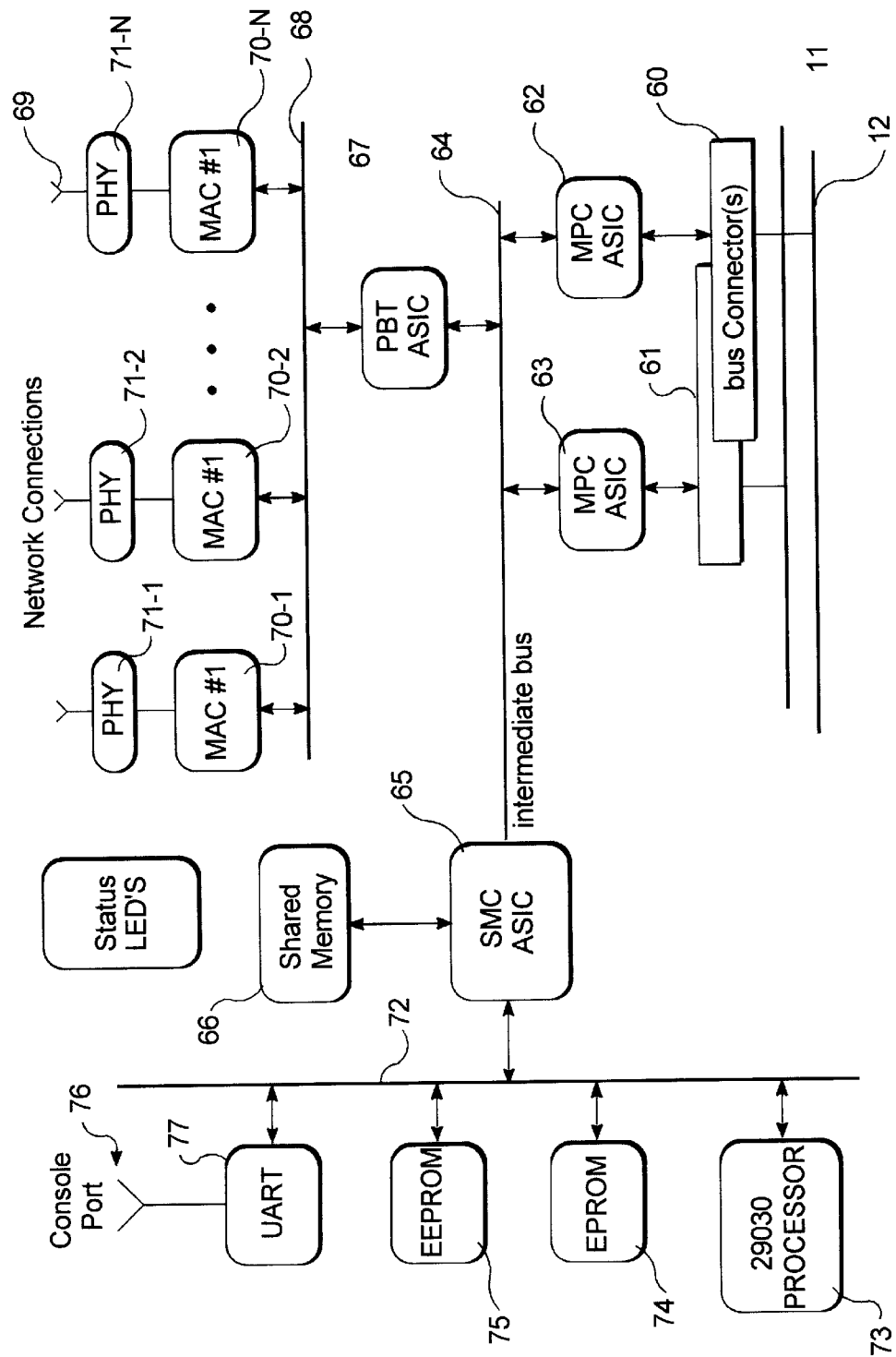
FIG. 4 provides a block diagram of an input/output module with an enhanced function processor (IOP) such as used in the system of FIG. 1.

FIG. 4 illustrates the block diagram of the higher performance input/output processor IOP of FIG. 1. This system is coupled to the first bus 11 and the second bus 12 through respective bus connectors 60 and 61. The bus connectors 60 and 61 are coupled to message passing controller ASICs 62 and 63, respectively, which are, in turn, connected to an intermediate bus 64. The intermediate bus (also called internal bus herein) is coupled to a shared memory controller 65 which controls access to a shared memory resource 66. The intermediate bus 64 is coupled through a peripheral bus interface 67 to a network data bus 68. On the network data bus, there are a plurality of network connections, generally 69, made through respective MAC devices 70-1 through 70-N and physical interfaces 71-1 through 71-N. The shared memory controller 65 is also coupled to a control bus 72, which is connected to a high speed processor 73, flash programmable read only memory 74 storing programs, non-volatile EEPROM memory 75 storing parameters and static code, and a console port 76 through a UART interface 77.

Figure 5:
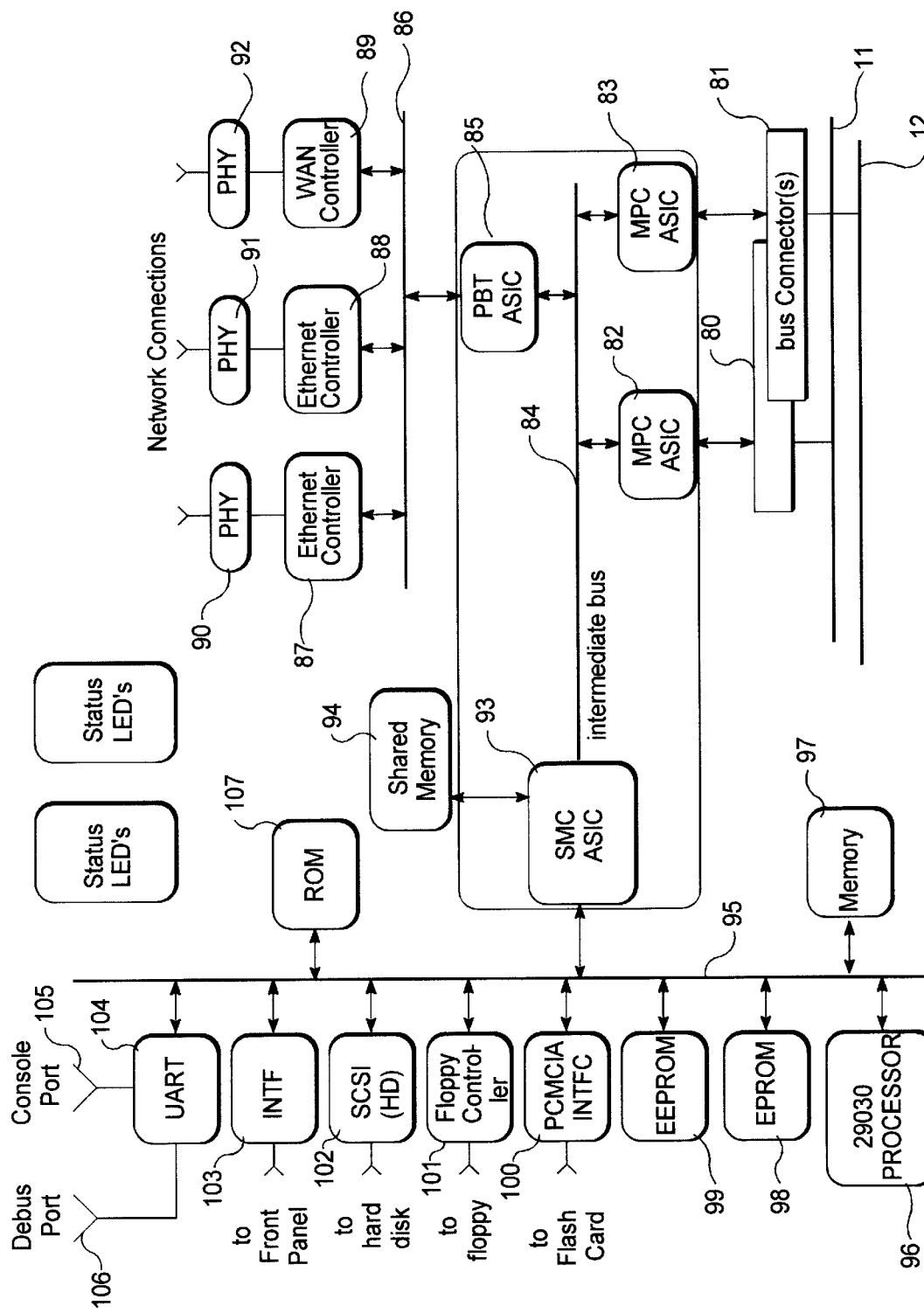
FIG. 5 provides a block diagram of the central internetworking processor (COX) used for providing a shared resource for the other processors coupled to the buses in the system of FIG. 1.

The central control box is illustrated in FIG. 5. This box is basically similar to the box of FIG. 4. Thus, the box includes a first bus connector 80 and a second bus connector 81 for the first and second buses, respectively. Message passing controllers 82 and 83 are coupled to the bus connectors 80 and 81, and to an intermediate bus 84. A peripheral bus transfer ASIC 85 is connected between the intermediate bus and a peripheral bus 86. An Ethernet controller 87, an Ethernet controller 88, and a wide area network (WAN) controller 89 are coupled to the peripheral bus 86 and to the respective networks through physical connections 90, 91, and 92.

The intermediate bus 84 is also connected to a shared memory controller 93, and through the shared memory controller 93 to a shared memory resource 94. A second shared memory resource may also be connected directly to the MPC ASIC 82 or 83. The shared memory controller 93 is also connected to a processor bus 95 which interconnects a processor 96, working memory 97 for the processor, flash memory 98 for processor code, EEPROM memory 99 for static code and parameters, a PCMCIA interface 100 for accepting flash memory cards for upgrade purposes and the like, a floppy disk controller 101 for driving a floppy disk, an SCSI interface for connection to a hard disk 102, an interface 103 for connection to a front panel providing a user interface, and a dual UART device 104 which provides for connection to a console 105 and a debug port 106. In addition, read only memory 107 may be connected to the processor bus 95. The native PCMCIA interface is provided for enabling a redundant reliable boot mechanism.

The software processing for a high performance router breaks fairly cleanly into two major pieces: the data forwarding functions and the control/management functions. The data forwarding functions include device drivers and link-layer protocols such as HDLC-LAPD in addition to the per-packet processing involved with recognizing, validating, updating, and routing packets between physical interfaces. The control and management software functions include routing protocols and network control protocols in addition to all configuration and management functions.

In general, the data forwarding functions are optimized for maximum performance with near real-time constraints, whereas the control and management functions simply run to completion on a time available basis, with some exceptions. When system performance is measured, it is primarily the forwarding capacity of the router in terms of bandwidth, packets-per-second, and fan-out that is considered, with an implicit assumption that the control and management functions will be sufficient. The control and management software comprises the vast majority of the code and can use large amounts of data space, but most of the data space consumed by these functions need not be shared with the forwarding software.

In the system of FIG. 1, the forwarding function is replicated in distributed protocol modules in the semi-intelligent and full function processors IOS and IOP, with distributed protocol module servers along with the full function routing and other centralized functions running on the single central processor COX. Thus, the forwarding functions where possible run on processors near the physical interfaces, and mechanisms, including hardware supported message passing, tie the distributed processing modules to each other and to the central control functions. This architecture allows some forwarding functions to be distributed, while others are centralized on the central control box. The message passing architecture enables significant flexibility in the management of the location of software in the router architecture. Further, backward compatibility and system scalability are preserved.

II. MESSAGE PASSING STRUCTURES AND PROCESSOR

Figure 6:
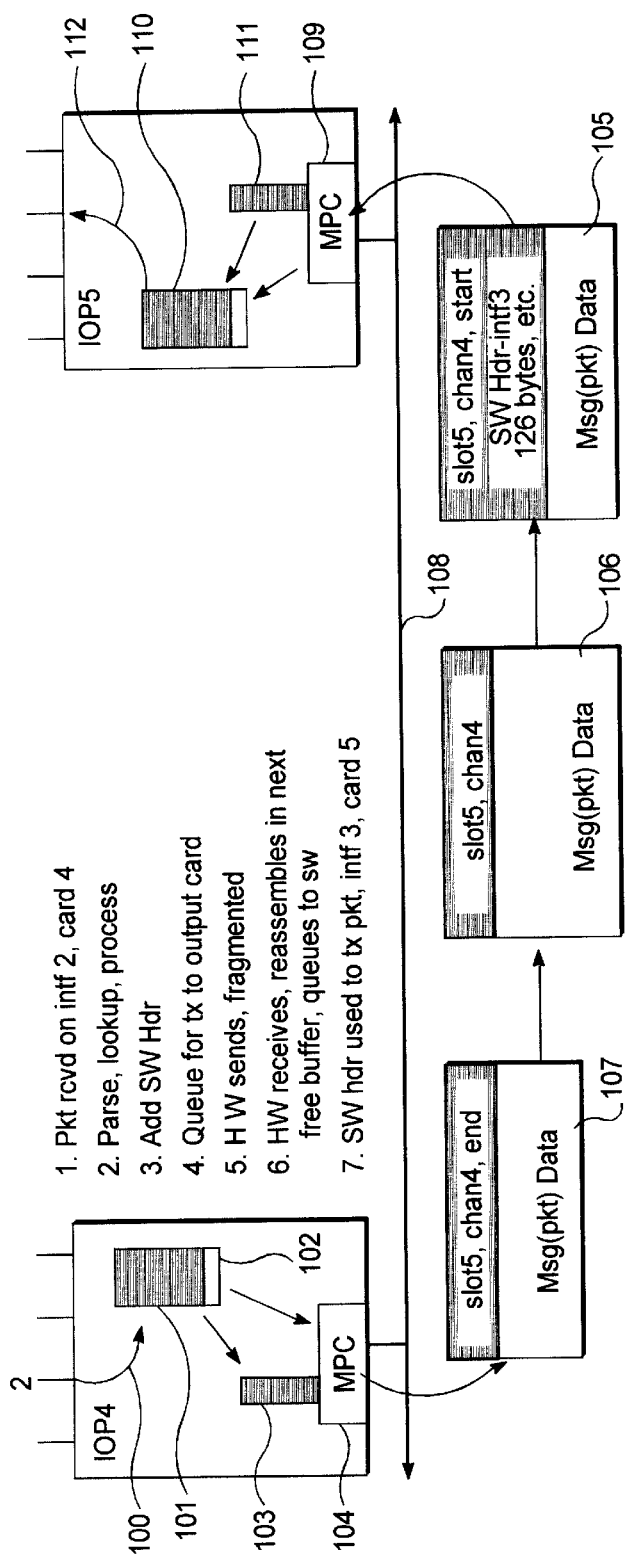
FIG. 6 is a heuristic diagram providing an example of message transmission for the system of FIG. 1.

The basic message passing technique is illustrated with respect to FIG. 6. In FIG. 6, the process of receiving a packet on interface 2 on card 4 is illustrated. Thus, the packet is received and proceeds along arrow 100 into a buffer 101 in the card. While it is in the buffer, the processor parses the packet, looks up the destination for the packet, and processes it according to the routing code. Next, a software header 102 is added to the packet. Then, a command or set of commands to transmit a message which carries the packet is added to a queue 103 for message transmission. The hardware 104 in the card sends the message or messages in a segmented state, which includes a first message cell 105, which has a start identifier, a channel identifier, and a destination slot identifier (in this case, slot 5, channel 3). The first cell includes the software header which identifies the destination interface as interface 3 in processor 5, the length of the packet, etc. Cell 105 includes the first part of the packet data. The next cell 106 of the message includes a header indicating the destination slot and its channel as well as packet data. The final cell 107 includes the destination and its channel, and an indicator that it is the last cell or "end" in the message. Finally, this last cell 107 is filled with the balance of the message data. These three cells of the message are transferred across the high speed bus 108 to the destination slot 5. In slot 5, the hardware 109 receives the cells, reassembles then in the next free buffer 110, and queues the message to software in the queue 111. The software and hardware in the IOP at slot 5 transmit the packet carried by the message out interface 3 in card 5 across the arrow 112, in this example.

Thus, in this application, the term "packet" refers to a data structure which is received from a LAN or WAN link coupled to the router which executes the message passing process. A message is a data structure, which may comprise one or more fragments, specified by one or more commands in the transmit queue for transmission by the message passing system. A cell is a data structure which is created by segmenting a message for transmission across a particular backplane bus to the destination. The cells are then reassembled at the destination into messages. Packets for transmission out of the routing system can be recreated from messages or generated in response to messages. Thus, in this application, the use of the words "packet", "message", "fragment", and "cell", are intended to have the meanings implied by this paragraph, unless another meaning is clear from the context in which the term is used.

This message passing protocol is a "push" paradigm, which has the effect of using the bus more like a LAN than a normal memory bus. This has several important features:

Receiver allocates/manages buffering independent of transmitter.

Single "address" used for all data sent in one message.

Bus addressing is per-card, port-level addressing in software header.

Bus used in write-only mode.

No shared memory usage.

Reliability not guaranteed (must be supplied at a higher level, if needed).

Messages are sent as a stream of cells, interleaved with other message transmissions.

The paradigm provides the following benefits:

Improved protection/robustness.

Reduced driver overhead.

Reduced complexity, per-destination queues not required, etc.

Improved bus utilization (about 3× previous).

Bus is not monopolized by one device during a message transmission. Other slots can interleave cells on the bus, so they do not have to wait for a long message from another slot.

In FIG. 6, IOP4 receives a packet, and sends it to IOP5. Note that the input card simply sends the message to the output card. The sender does not need to allocate buffers or get permission from the receiver. A hardware address specifies the slot that should receive the message. A software message header specifies the message type (control, data, etc.), its actual length, output port number, etc. The output card is responsible for dropping messages if there is too much traffic.

Figure 7:
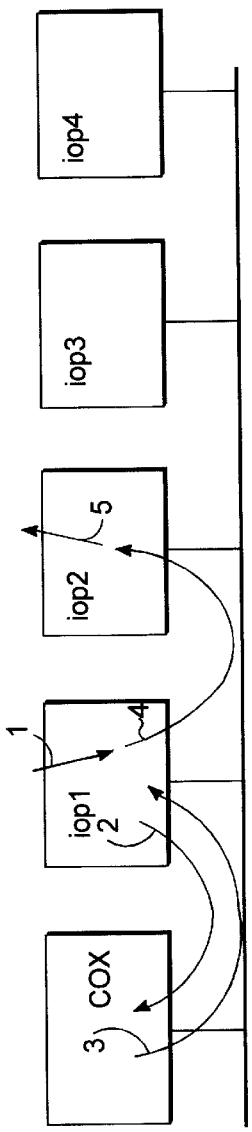
FIG. 7 illustrates message flow scenarios for a system such as that shown in FIG. 1.

FIG. 7 is an example of how messages will flow in the system of FIG. 1 in order to forward a network packet. In this example, the path that a packet follows to a destination unknown by the receiver card IOP1 is shown.

Packet enters from network attached to IOP1 (transition 1). The local processor looks up the destination (whether it be bridged, or routed by various protocols), and finds it does not know what to do with this packet. It generates a high priority cache lookup request and sends it to the COX. The COX looks up the destination network in its database, and sends back the answer to IOP1 (3). IOP1 adds the destination to its cache, and finds the held packet. It then directly forwards it to IOP2(4) as a message complete with instructions on what to do with the packet. IOP2 examines the message header and determines it should transmit the packet out port X(5). IOP2 DID NOT examine the actual packet in any way. It simply looked at a simple message header, and decoded the command to transmit the enclosed packet to port X.

If the packet originated from an IOM, then the IOM puts the packet in COX memory. The COX does the same functions as outlined above, for the IOM based packet. Packets destined for an IOM are sent to the COX which queues them for transmission. In other words, existing IOMs are just ports on the COX as far as the message passing paradigm goes.

Also notice that if IOP1 has the destination already stored in the local cache (normal case), then messages 2 and 3 are eliminated. In either case the packet data only travels across the bus once.

This system uses a layered architecture for communication between processors, with a common set of message passing services supporting both control and data paths. It utilizes the bus for the physical layer and either shared-memory DMA-based software or hardware-supported card-to-card transmissions to provide required services for various classes of messages. The three major classes of message are:

Internal control messages: low latency (<10 ms), high reliability, low volume.

Network control messages: medium latency (<250 ms), high reliability, low volume.

Normal data packets: best effort latency, average (best effort) reliability, high volume.

Note that the system is designed to require only loose synchronization between processors. There are no critical real-time constraints on any control messages between processors that would cause the system to break if they were not met. All inter-processor control functions must tolerate lost messages. Some data loss will be acceptable. For instance, a route cache update or a port down message could be lost, as long as the system continues to run smoothly.

Figure 8:
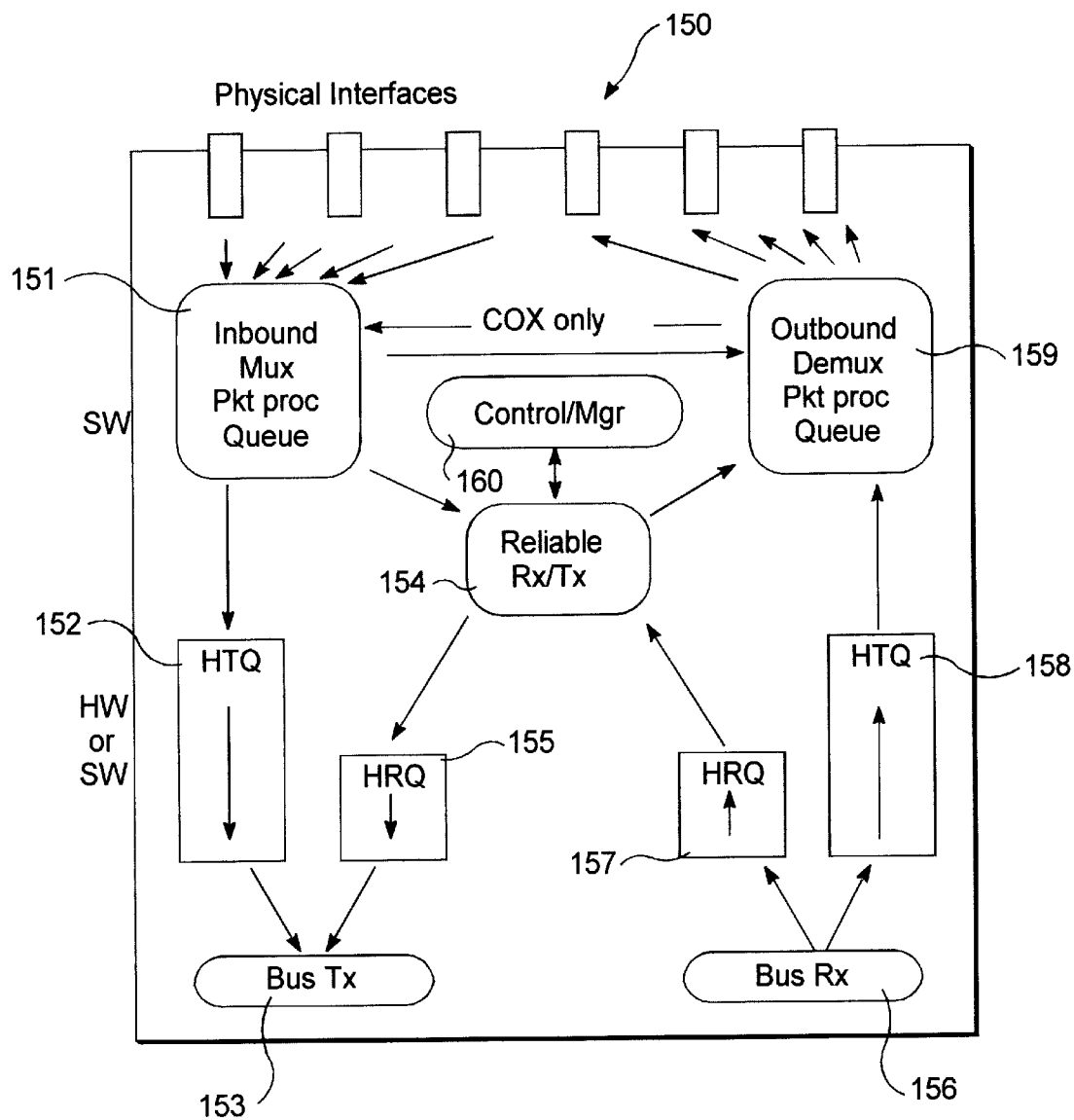
FIG. 8 provides a diagram of the dual queue structure and message paths for the bus interfaces in the system of FIG. 1.

At the lowest layer above the actual data movement function is a dual-queue structure, as illustrated in FIG. 8, which supports these message classes according to their primary service requirements. These queues may be supported in software, in hardware, or in a combination of the two. One queue is designed to provide high reliability and low latency with relatively low throughput, and is used for the first two classes of messages—internal and network control messages. The second queue is optimized for high throughput and supports the majority of the data traffic.

Both control messages and data packets are encapsulated with a standard header which conveys the message type, destination addressing (output port, control interface, etc.), and other control information associated with the message. For internal control messages this additional information might include sequence numbers, event handles, etc., while data packets might have MAC encapsulation type, transmission priority, etc.

FIG. 8 illustrates the basic dual queue structure used in the messaging paths. In this structure, the card will include a plurality of physical interfaces, generally 150. Inbound data from the physical interfaces is placed in an inbound multiplexing packet processing queue 151, generally implemented by software. This packet processing queue does the basic data transport processes as described above. From this queue 151, the messages which encapsulate the packets are transferred to a high throughput queue 152 implemented at either hardware or software. From the high throughput queue, messages are transferred out onto the bus transmission path 153. Alternatively, communications which must be reliable are passed through a reliable receive and transmit block 154 where they are tagged for preferential handling at the receive end, and manually passed to a high priority, low latency queue (HRQ 155) and out through the bus transmit function 153. Similarly, cells of data received from a bus receive path 156 is passed either through a high reliability queue 157 or a high throughput queue 158. The high reliability queue is passed to the reliable receive and transmit block 154 into the outbound demultiplexing packet processing queue 159. Alternatively, control and management functions 160 receive data through the reliable path. The outbound software queue 159 sends appropriate packets to the physical interfaces 150. There may also be a path between the inbound and outbound software queues 151 and 159.

As illustrated in the figure, preferably the lower level queues 152, 155, 157, and 158 are implemented in the hardware assisted environment while the higher level queues 151 and 159 are software executed by a local processor on the board. However, in the central processor unit, the lower level queues may be implemented in software which serves the IOM blocks described above with respect to FIG. 2, and interface processors may be implemented in the particular application with these queues in software.

FIG. 9 provides a table of the various data transfers supported by the system of the preferred embodiment. The table indicates the transfer type across the top row, including a message transmit, a shared memory write, a shared memory access read, a shared memory read, a memory move, a cell transmit, a message receive, a bus input/output and bus memory write, a bus read, and a promiscuous receive transfer. The table summarizes the source of the source address, the source of the destination address, the direction of the transfer, the origin of the cycle, the receive activity, the data buffering, and the alignment and packing functions for each of the different transfers.

Thus, the system includes a number of hardware and software system buffer structures and control and management modules. Generally, data fragments are gathered and byte-wise aligned to form cells which move across the bus. At the receiving end, cells may be placed into a receive buffer as allocated by the receiving processor.

The basic structures include a command list, a free list, and a receive list.

The command list is a managed string of four word entries through which software instructs hardware to perform certain data transfers, generally across the bus. The blocks of memory to be moved may be thought of as buffers, or as data fragments. There is no hardware requirement for these chunks of data to be aligned or sized in any specific way. Implicit in the source and destination address along with the command list entries control field is the type of data transfer. The command list is built in synchronous dynamic RAM (SDRAM) and may be FIFOed (or cached) within the message passing controller hardware. Software writes entries into the command list, while hardware reads and executes those commands. The command list is managed via command head and command tail pointers.

The free list is a series of single word entries pointing to available or "free" receive buffers which may be allocated by hardware for buffering inbound bus data. The free list is maintained in SDRAM and may be FIFOed or cached within the message passing controller hardware. Software places free receive buffers into the free list so that hardware may then allocate a free buffer to a given receive channel, as required by incoming data. Once the buffer is actually filled, hardware places the buffer pointer into one of two receive lists. Only software writes entries to the free list, and those entries are known to be valid by the contents of the software based free tail pointer. Hardware may read entries from the list, and the only indication of what has been read is the value of the hardware-owned free head pointer.

The receive list is a series of two word entries pointing to full receive buffers which need the attention of software. The list itself is SDRAM resident and the list entries point to receive buffers which also reside in SDRAM. In addition to the physical address of the filled buffer, the receive list entry includes a flag and count field.

Figure 10A:
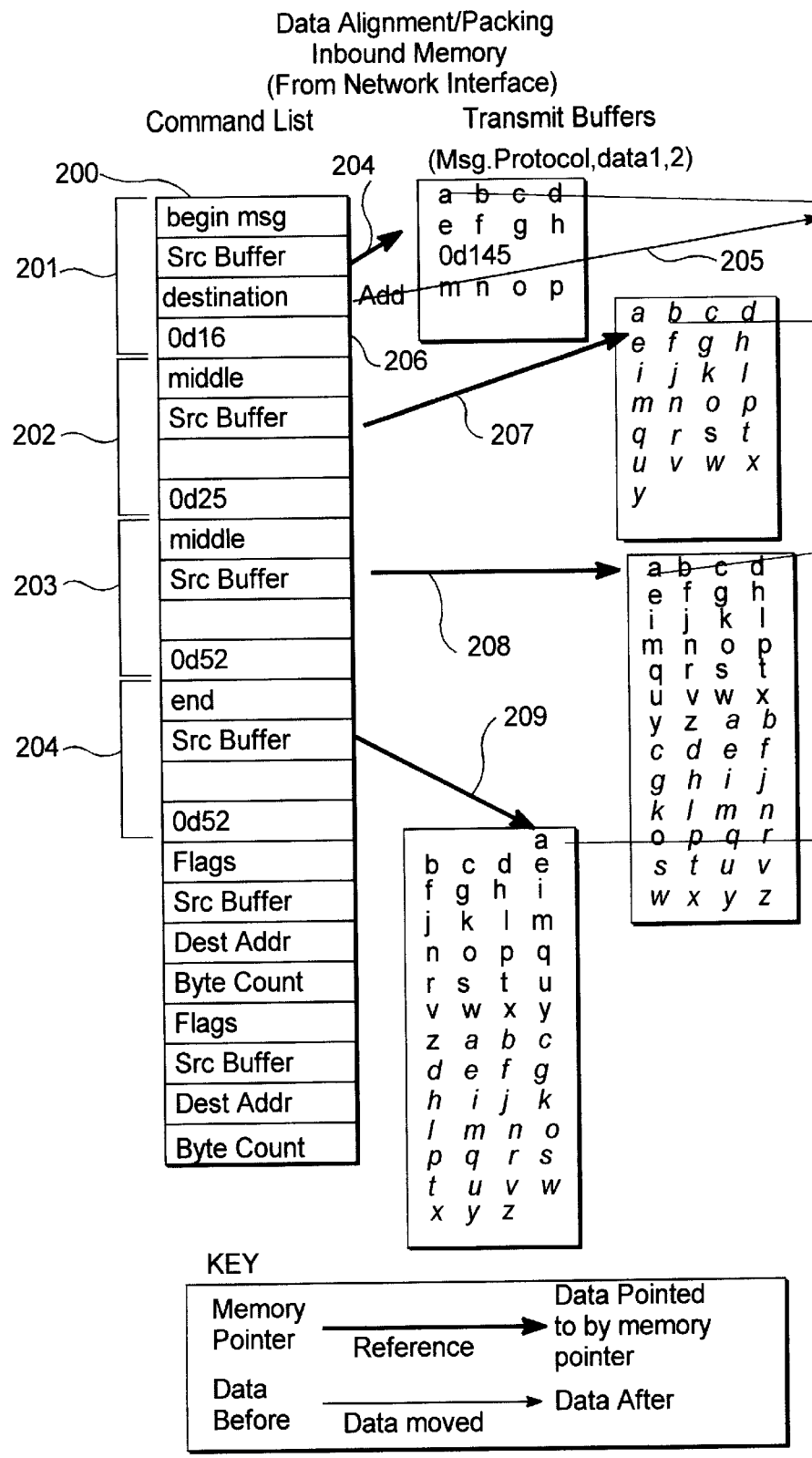
FIG. 10 illustrates the data alignment and packing for messages transferred on the bus.
Figure 10B:
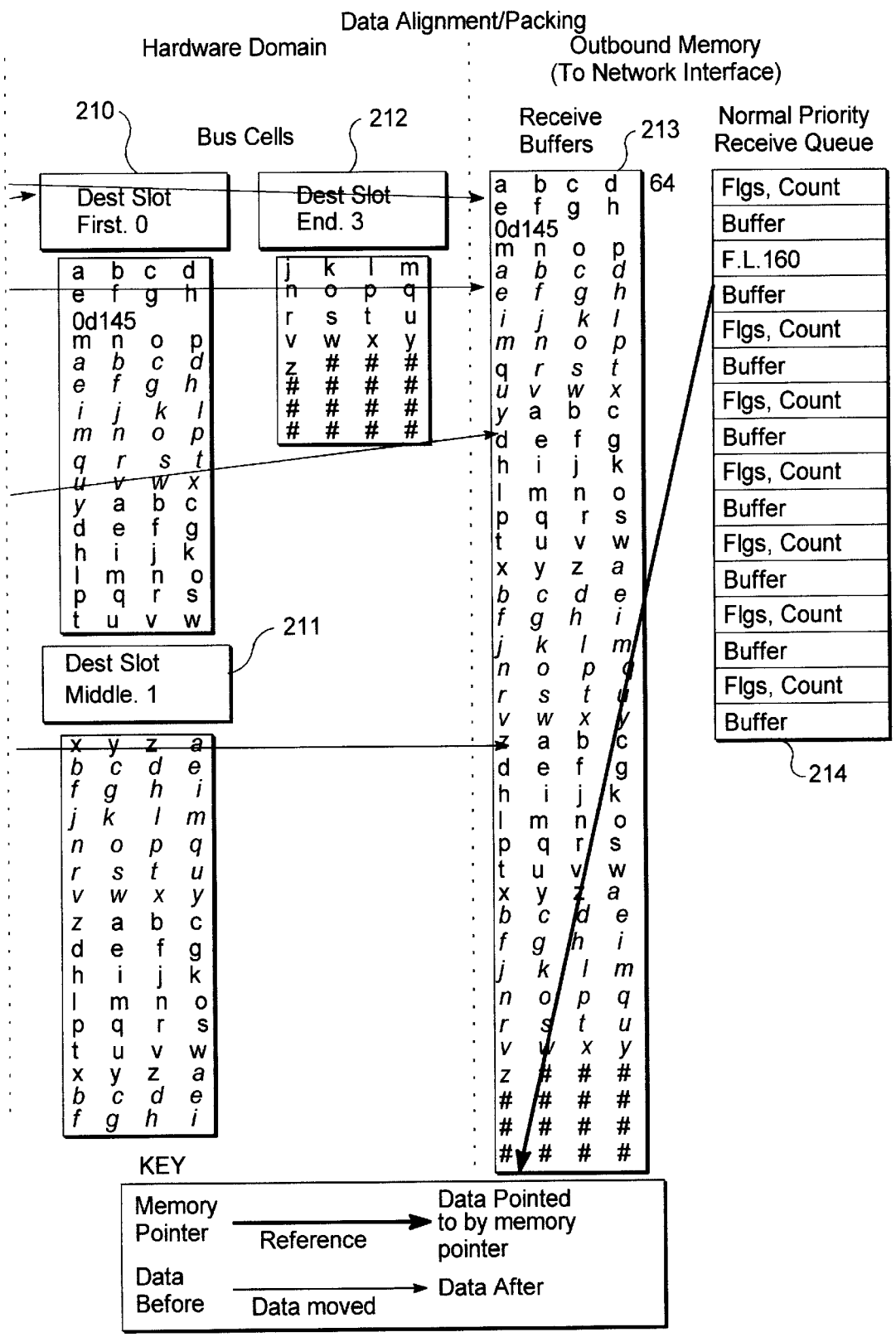

FIG. 10 shows the data flow beginning with a command list and eventually showing up on a normal priority receive list.

As can be seen in FIG. 10, a command list 200 includes a sequence of four word entries. For example, the four entries 201, 202, 203, and 204 characterize a transfer from a network interface in one processor across the bus to a network interface in a different processor. The first entry is recognized as the beginning of a message, includes a pointer 204 to a source buffer, a destination address 205 indicating the destination slot (and bus if plural busses are used) of the message, and a data length field 206. The next entry 202 includes flag indicating that it is a middle fragment, a pointer 207 to a source buffer, and a data length field. The third entry in the list 203 includes a control parameter indicating that it is a middle fragment, a pointer 208 to a source buffer, and a data length field. The final entry 204 includes a header indicating that it is the end of the message, a pointer 209 to the source buffer and a length field.

The transmit buffers pointed to by the pointers 204, 207, 208, and 209 contain the data of the message. They are concatenated according to the protocol and data length information in the first buffer pointed to by the pointer 204. The message packing buffers are used to generate a first bus cell generally 210 which includes a destination slot address, an indicator that it is the first cell in a message, and a count. The first cell in this example includes the contents of the buffer from pointer 204, the buffer from pointer 207, and a portion of the buffer at pointer 208.

The balance of the buffer at pointer 208 and the first portion of the buffer at pointer 209 are combined into the second cell 211. The balance of the buffer at pointer 109 is placed into the last cell 212.

The outbound path in the receiving processor loads the incoming data into the receive buffers 213 and creates an entry in the normal priority receive queue for the receive buffer.

Figure 11:
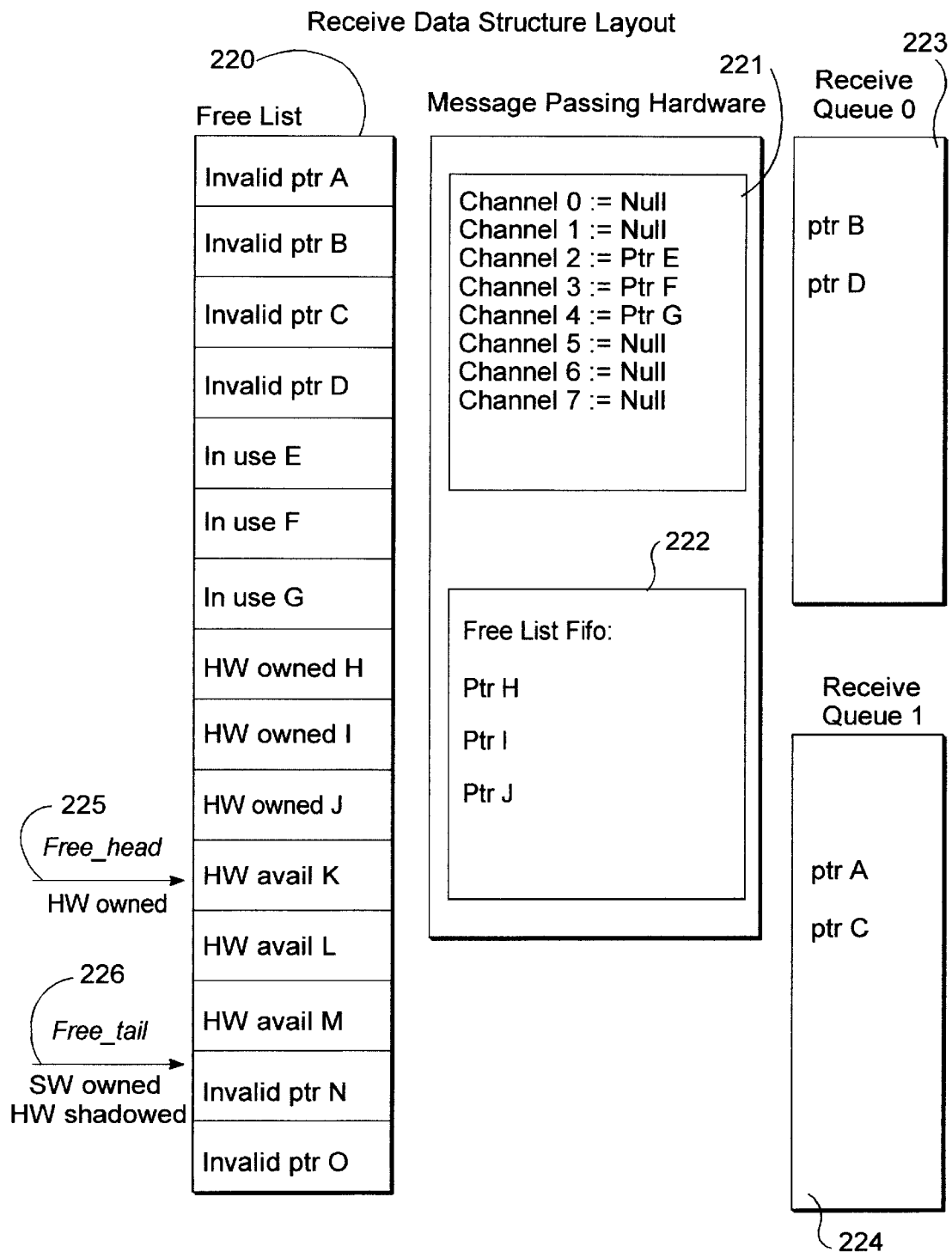
FIG. 11 illustrates the receive data structure layout for the bus interfaces.

The receive data structure is illustrated in FIG. 11. Basically, an incoming data stream is allocated to receive buffers using the free list 220, the channel status SRAM 221, the free list FIFO 222, and the high and low priority receive queues 223 and 224.

The hardware keeps state information for 32 receive channels. Each channel allows one message to be assembled into a cohesive message in memory. The channel keeps pointers to the next place to store the cell as well as a count and status information associated with the message. In one embodiment, receive channels are allocated to particular slots. Thus, slot zero on the bus will be given channel zero, for every processor on the bus; slot one will be given channel one; and so on.

The free list 220 is managed with a free head pointer 225 and a free tail pointer 226. Basically, buffers between the hardware owned free head pointer 225 and the software owned free tail pointer 226 are available for the hardware. Buffers pointed to by pointers above the free head pointer are either invalid because they contain data from previously received messages yet to be processed, are in use by a particular channel, or have been taken over by the hardware and loaded into the free list FIFO 222. In the example illustrated in FIG. 11, the invalid pointer N and invalid pointer 0 represent pointers to buffers which have been processed, and would be available for hardware when the free tail pointer is moved by the software.

Figure 12A:
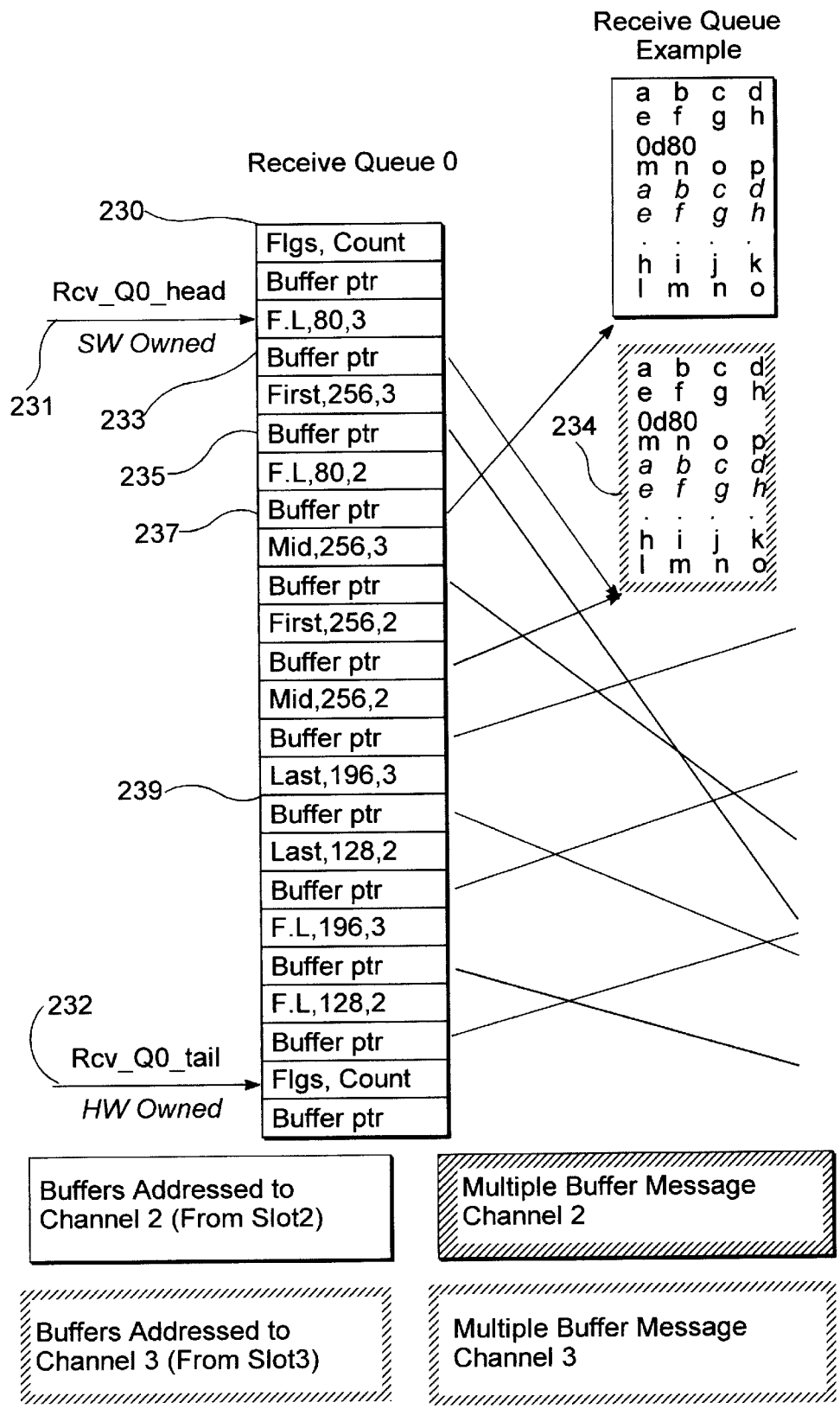
FIG. 12 provides a receive queue example for the bus interface according to the present invention.
Figure 12B:
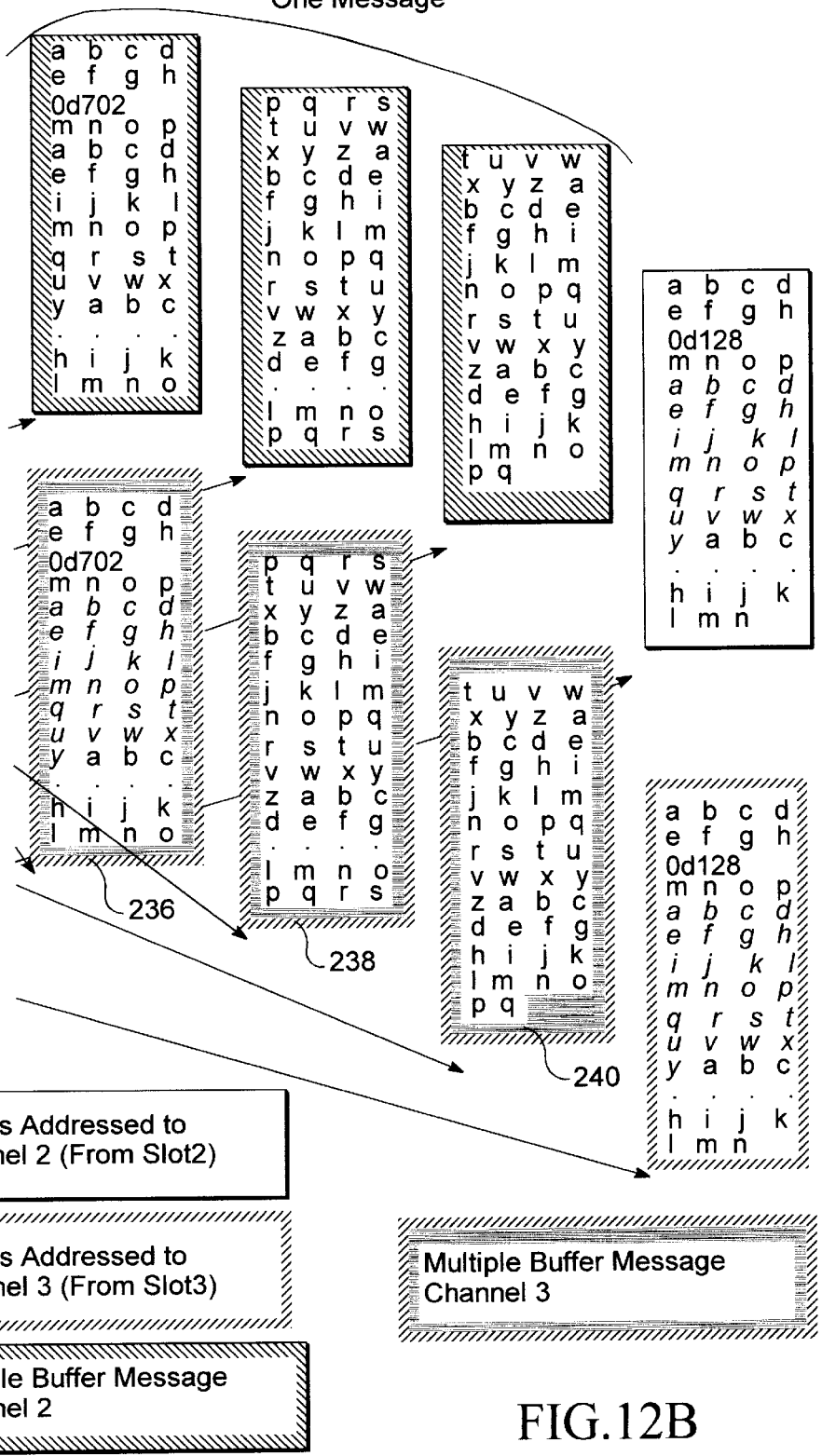

FIG. 12 provides a receive queue example. The receive queue 230 is managed using a receive queue head pointer 231 and a receive queue tail pointer 232. Each entry in the receive queue includes flags, count, and a buffer pointer for a specific buffer. Thus, those entries between the head 231 and the tail 232 contain pointers to buffers in use. Thus, an entry 233 includes a flag indicating that it is both the first and the last cell in a particular message, a length value, and a channel identifier. Entry 233 also includes a buffer pointer to the end of buffer 234. In an alternative embodiment, the buffer pointer points to the beginning of the buffer, as can be seen, this is a pointer to a buffer in channel three of length 80.

The next entry 235 is the first buffer in a 256 byte transfer in channel three with a pointer to buffer 236. The next buffer in this message is characterized by entry 237. It includes a pointer to buffer 237 and a parameter indicating that it is the middle transfer in the message. The last cell in this message is characterized by entry 239, which includes a pointer to buffer 240. The other examples shown in FIG. 12 include transfers that are characterized through a second channel, channel two, as described in the figure.

Hardware calculates the difference between the free head and the free tail pointers and uses that value to decide when to drop buffers in the receive queue to free up space to accept additional messages. This mechanism provides higher reliability to high reliability queue, and a lower reliability to high throughput transfer queue which are found in the receive list. Hardware will provide a number of watermarks that can be used to determine whether to accept new high throughput queue messages, or whether to drop them. The high throughput messages will be dropped so that the free list will not become depleted and high reliability queue messages can always be received. The source of the high reliability queue messages either has to have exclusive permission to send X number of frames, or get new permission occasionally through a handshake protocol, or the sender can rate limit requests to some number/second that the receiver must be configured to handle.

This mechanism will also be used to provide several levels of priority to provide some level of fairness among the high throughput traffic. The concept is to mark a small number of packets per second as high priority, and the rest as normal priority. The receive hardware will start dropping normal priority messages first, and this should guarantee that each slot can get data through, even in the case of another sender trying to hog the bandwidth.

Figure 13:
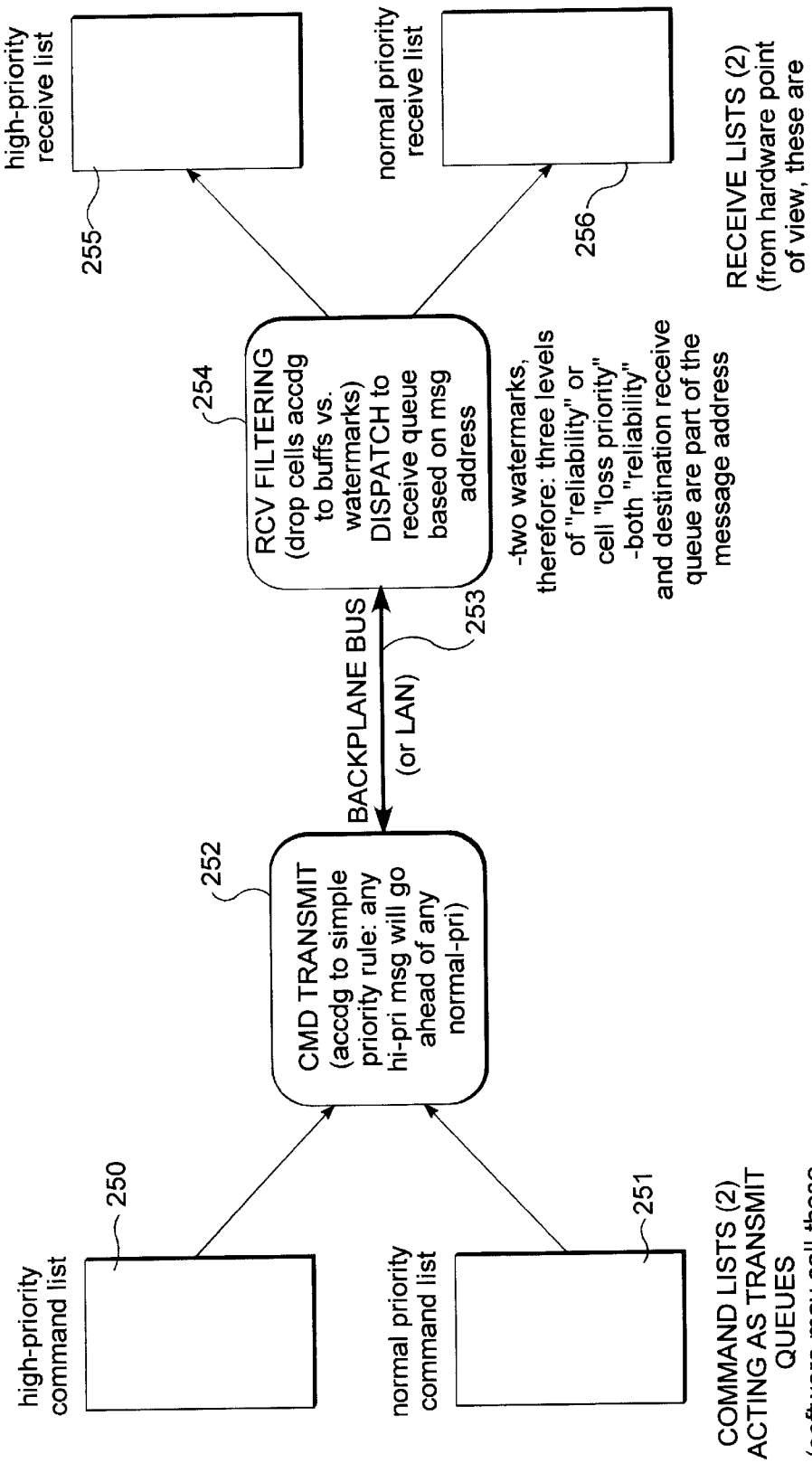
FIG. 13 illustrates the data flow from the high and normal priority command lists to the high and normal priority receive lists according to the present invention.

FIG. 13 illustrates transmit list and receive list processes according to one embodiment of the present invention. As can be seen in the figure, the transmit side includes a high priority command list 250 and a normal priority command list 251. In the message passing process, a command transmit function 252 is included which is coupled with both the high priority command list 250 and the normal priority command list 251. This transmit function 252 transmits commands across the backplane bus 253, or other communication media such as a LAN, to a receive filtering process 254 at the receiving end of the message transfer. Receive filtering process 254 also includes dispatch logic which dispatches the messages to either a high priority receive list 255 or a normal priority receive list 256.

In operation, these functions are managed by software according to latency, throughput, and reliability of the messages being transmitted. For example, software may write commands for messages that require low latency into the high priority command list 250, while writing the majority of commands which require high throughput into the normal priority command list. According to this approach, the command transmit function 252 can select commands for transmission according to a simple priority rule: any high priority message goes ahead of any normal priority message. More complex priority schemes, including fairness concepts and avoiding lockouts could be utilized as suits a certain implementation. Messages transmitted across the backplane 253 are accepted by the receive filtering function 254. The filtering function drops the cells in a message according to the available buffers as measured against watermarks based on reliability tags in the message header, and routes the received messages to either the high priority receive list 255 or the normal priority receive list 256, based on a control bit in the message header. For example, in a system with two receive buffer watermarks, there will be three levels of reliability (or cell loss priority) established. All those cells making up a message in a first class will be dropped if the number of available receive buffers falls below a first watermark before all cells of a message are received. Cells of messages in a second class will be dropped when the number of available buffers falls below a second watermark. Cells of messages in the final class are dropped only if there are no receive buffers left to receive incoming cells of the message. Both the watermark class, which establishes the reliability of transfer, and the destination receive queue to which the message is dispatched, are specified in the message address, as control bits in a preferred embodiment. Thus, from the hardware point of view, the receive lists 255 and 256 are identical in behavior. Software manages the processing of messages listed in the high priority receive list and the normal priority receive list as desired in a particular implementation. For example, the software may process all high priority receive list messages first, so that so called low latency messages can achieve lowest latency available. High throughput messages will be routed into the normal priority receive list, and managed as quickly as possible by the receiving processor.

Hardware initiates message transmit from a command list maintained in SDRAM. The message may consist of multiple fragments stored in SDRAM memory which are then packed into double-buffered outbound cells. The bus transfer address is really a message control field containing such things as a field identifying the cell as part of a message, the destination slot and logic channel, first and last cell control bits, and the cell sequence number within the message.

To transmit a message fragment:
read command list entry, decode as outbound msg fragment (for addr generation).
recognize first, middle, last fragment of a message (for outbound buffer control purposes).
request SDRAM read access (and check packing cell buffer availability).
wait for granting of SDRAM resource.
if buffer available, begin transferring data bytes/words from SDRAM to cell buffer.
continue to move data to cell buffers (with data flow control).
maintain cell buffer byte count and buffer status to implement flow control.
pack and align data within cells.
generate message address for bus (including first, last, sequence information).
generate bus transfer byte count field (depends on size of buffer flush).

queue cell for flush (i.e., bus transmit).

arbitrate for bus interface resource (other functions may request bus transfer).

wait until bus interface granted.

arbitrate for ownership of bus.

move data words from cell buffer to bus interface (with flow control).

generate or check outbound data parity.

complete burst write on bus.

log cell transmit status (success/fail).

free cell buffer for more outbound data.

move more data from SDRAM into cell buffer.

continue this process until fragment move is complete.

update command list pointer (indicates transfer complete).

To transfer a complete message:

process multiple fragments from command list as detailed above (a message may be a single fragment).

pack fragments into continuous cells without gaps.

flush partial cell buffer when message ends.

notification of message sent.

Registers in the MPC are listed below with detailed description of their function. The name will be given first, then in parentheses the address offset is stated in hexadecimal. The size of each register will be given along with a description of the register's function. Unless stated otherwise, assume that the register is R/W. Unless stated otherwise, assume that all registers are set to zero when the MPC comes out of reset.

1. System Registers

Slot Number (0000)

This is a 4-bit register providing the encoded slot number, from 0 to 16.

Arbitration and Priority ID (0004)

This 4-bit register provides a device with an encoded arbitration ID. The priority bit used by the device is determined by adding 16 to the arbitration ID. This use of priority is enabled by device specific means.

Arbitration Mask (0008)

This 16-bit register is used to mask (AND) arbitration/priority levels on the bus. Thus, O's are set in every bit corresponding to non-existent cards, and 1's are set in every bit corresponding to existing cards. Thus, all devices must drive both arbitration and priority lines during every arbitration phase.

Revision Register (000C)

This 4-bit read-only register gives a revision number for the Core bus device.

Core Bus Device Type (0010)

This 8-bit register gives a hard coded bus device type. Different core bus devices will have different register configurations, so software must check the value in this register before attempting to program the device. The CMC is set to 0, CMPI is set at 1, and the MPC will be set at 2.

Backoff Timer (0018)

This 3-bit register indicates how long to wait when a backoff indication is received.

Parity Error Byte Flags (001C)

This 5-bit register has one or more of its four bits set to indicate which bytes of the data at the affected address caused a parity error. The appropriate bits in this register are written by a core bus device receiving core bus data with bad parity. These flags are read only. The lowest 4-bits indicate a data parity error, while the highest bit indicates an address parity error. The lowest bit is associated with the data byte on D0–D7, and the fourth lowest with the data on D31–D24.

Address Generating Parity Error (0020)

This 32-bit register holds the address which had parity error problems.

Backoff Counter (002C)

This 4-bit read/write register gives a count of the number of backoffs received by this chip. An error is generated by the chip when 16 backoffs in a row are received.

Corebus Device Configuration (0030)

This 5-bit register holds the reset and enable bits shown in Table 1:

TABLE 1

Corebus Device Configuration

| Bits | Description |
|---|---|
| 4 | BRES - This bit is used to reset IOP board (See the "Reset" chapter for additional detail) |
| 3 | SCRES - When this bit is set it initiates a cold reset. A cold reset reinitializes all values to be identical to power-up except that the error state information is saved. This bit can also be set as a side effect of the Corebus ERR bit being set more than 24-clock period. |
| 2 | SWRES - When this bit is set it initiates a warm reset. A warm reset stops operation of the device and returns it to a known free and idle state, disabling operation, but does not reinitialize the values of registers. The SWRES bit can be set by the ERR signal being asserted more than 12 clock periods. |
| 1 | ARBE - This enables the device to drive its arbitration bit on the Corebus. Note that driving its arbitration bit is not the same as asserting its arbitration bit. |
| 0 | CBE - This enables the device to transmit over the Corebus. When disabled the device may still participate in arbitration. |

Core Bus Error Status (0128)

This 10-bit register provides error bits to guide the software when it receives an error interrupt as shown in Table 2. Any bit set causes the error interrupt to be requested.

TABLE 2

Error Status Register

| bits | Description |
|---|---|
| 0 | This bit indicates that a Core bus time out occurred. |
| 1 | This bit indicates that a backoff retry sequence was not successful. |
| 7:4 | These bits indicate a parity error occurred on data sourced from the Core bus. If these bits are set it may be in tandem with bit 9 (processor read) or Core bus agent write. |
| 8 | This bit indicates that an address parity error occurred. |
| 9 | This bit indicates whether the last cycle that had an error was a write from another device or a read by this device. |

2. List Registers

There are a group of registers which can be described as list registers. There are registers for the free list, normal priority command list, high priority command list, normal priority receive list, high priority receive list. Each will have start, size, head, and tail registers. The start and size registers will be set during initialization by software. Initially both the head and tail registers will be set to 0. The MPC will be continually updating the head register. The software will occasionally read the head register and set the tail register (not necessarily at the same time). From the perspective of the MPC the head pointer will always be current while the tail pointer may be stale (being stale does not mean that it cannot be used, it means that the current tail pointer may be old).

2.a. Free List Registers

Figure 14:
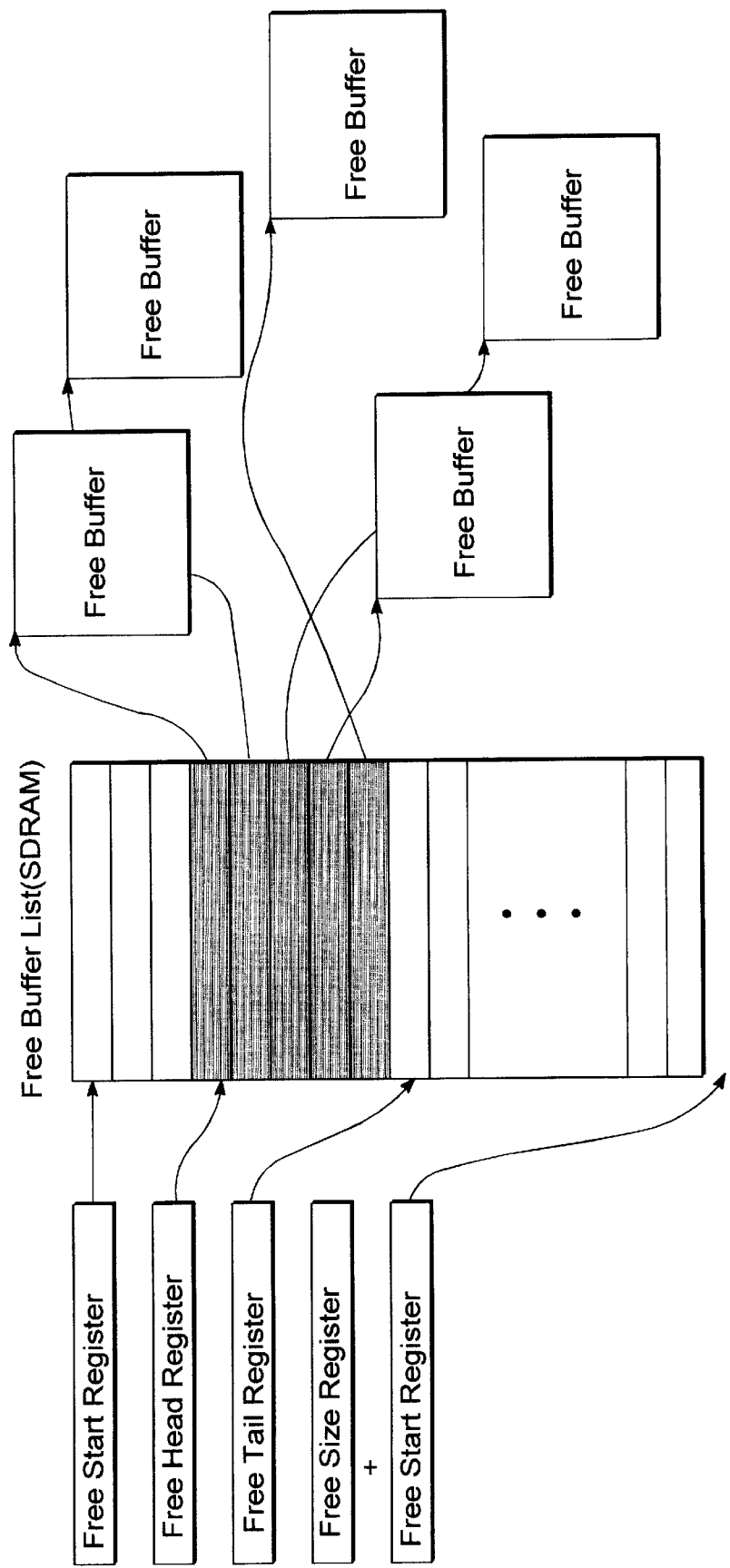
FIG. 14 illustrates the free list structure and its associated registers in the MPC and the free buffers in the SDRAM.

The free list registers have a series of pointers associated with it. The start pointer points to the beginning of the free list. The start + size will point to the location just below the bottom of the free list. The head pointer indicates the location in memory where the hardware removes the entries from the list. This pointer is set by the hardware. The software will have to query the hardware to get this information. The tail pointer points to the next location that software will allocate new free list pointers. FIG. 14 shows the free list structure and its associated registers in the MPC and the free buffers in the SDRAM.

Free Head Register (0200)

This is an 11-bit register which holds part of the address of a pointer in the free buffer list 1400 (in SDRAM) which points to the next free receive buffer (in SDRAM 1401) to be loaded into the free list buffer (in MPC). The bottom 6 bits of the 32 bit address are not included because the free list entries are transferred in 16-word aligned blocks. The top 15 MSB's of the address are not included because it will never change and is specified by the free start register. The value of the free tail register must be 1 or more higher than the value of the free head register for the MPC to use the entries specified by the free head register. If they are equal it means that there are no valid entries available. If the free tail register is smaller than the free head register, it means that the free tail register must have already wrapped around the bottom of the free buffer list and started from the top again. This means that it is alright to transfer the pointers to the free buffers into the MPC's free buffer list. Reads to this register will behave differently than writes because during writes the entire 32 bits of the address will be valid. This address is generated by concatenating the bits [31:17] from the free start register, the merge of bits [16:10] of the start with bits [16:10] of the free head, the bits [9:6] of the free head register and bits [5:0] are padded with 0's.

Free Tail Register (0204)

This is an 11-bit register which holds a portion of the address of a pointer in the free buffer list (in SDRAM) which will point to the next free buffer as determined by software. Like the free head register, the bottom 6 bits of the 32-bit address are not needed since software will be assigning 16 buffers at a time and the top MSB's of the address will not be needed since they will always be the same as the free start register. Once again, the reads to this register will behave differently than writes (see the free head register definition for additional information).

Free Start and Size Register (0208)

This is a 30-bit register which holds the 22 MSB's of the address of the top of the free buffer list (in SDRAM) and 8 bits of size information. A size value of 00000001 will correspond to the minimum normal priority command list size of 256 entries, 00000010 corresponds to 512 . . . 10000000 corresponds to the maximum normal priority command list size of 32768.

Free Watermark 0 Register (020C)

This 11-bit register stores the count (x16) of valid entries in the free list below which the hardware will have different characteristics knowing that the number of entries in the free list is getting low. The MPC will start dropping medium and low reliability cells when the free buffers are less than the number indicated by this register.

Free Watermark I Register (0210)

This 11-bit register is similar to the free watermark 0 register; just replace "0" with "1". The MPC will start dropping low reliability cells when the free buffers are less than the number indicated by this register.

2.b. Command List Registers

The command list registers are very similar to the free list registers. Both need to get information off a list while keeping track of where to get the next element of the list and the location of the end of the list. For the command list registers a watermark register will not be necessary. (Thus generating the difference between the head and tail register will not be necessary, just an equality check to see if we are out of commands.) The MPC will assume that the software will update the command lists 4 commands (16 words) at a time. If the software cannot fill the 4 commands, it will put the null command in the next empty command field.

Core Bus Device Type (0010)

This 8-bit register gives a hard coded bus device type. Different core bus devices will have different register configurations, so software must check the value in this register before attempting to program the device. The CMC is set to 0, CMPI is set at 1, and the MPC will be set at 2.

Backoff Timer (0018)

This 3-bit register indicates how long to wait when a backoff indication is received.

Parity Error Byte Flags (001C)

This 5-bit register has one or more of its four bits set to indicate which bytes of the data at the affected address caused a parity error. The appropriate bits in this register are written by a core bus device receiving core bus data with bad parity. These flags are read only. The lowest 4-bits indicate a data parity error, while the highest bit indicates an address parity error. The lowest bit is associated with the data byte on D0–D7, and the fourth lowest with the data on D31–D24.

Address Generating Parity Error (0020)

This 32-bit register holds the address which had parity error problems.

Backoff Counter (002C)

This 4-bit read/write register gives a count of the number of backoffs received by this chip. An error is generated by the chip when 16 backoffs in a row are received.

Corebus Device Configuration (0030)

This 5-bit register holds the reset and enable bits shown in Table 1:

TABLE 1

Corebus Device Configuration

| Bits | Description |
|---|---|
| 4 | BRES - This bit is used to reset IOP board (See the "Reset" chapter for additional detail) |
| 3 | SCRES - When this bit is set it initiates a cold reset. A cold reset reinitializes all values to be identical to power-up except that the error state information is saved. This bit can also be set as a side effect of the Corebus ERR bit being set more than 24-clock period. |
| 2 | SWRES - When this bit is set it initiates a warm reset. A warm reset stops operation of the device and returns it to a known free and idle state, disabling operation, but does not reinitialize the values of registers. The SWRES bit can be set by the ERR signal being asserted more than 12 clock periods. |
| 1 | ARBE - This enables the device to drive its arbitration bit on the Corebus. Note that driving its arbitration bit is not the same as asserting its arbitration bit. |
| 0 | CBE - This enables the device to transmit over the Corebus. When disabled the device may still participate in arbitration. |

Core Bus Error Status (0128)

This 10-bit register provides error bits to guide the software when it receives an error interrupt as shown in Table 2. Any bit set causes the error interrupt to be requested.

TABLE 2

Error Status Register

| bits | Description |
|---|---|
| 0 | This bit indicates that a Core bus time out occurred. |
| 1 | This bit indicates that a backoff retry sequence was not successful. |
| 7:4 | These bits indicate a parity error occurred on data sourced from the Core bus. If these bits are set it may be in tandem with bit 9 (processor read) or Core bus agent write. |
| 8 | This bit indicates that an address parity error occurred. |
| 9 | This bit indicates whether the last cycle that had an error was a write from another device or a read by this device. |

2. List Registers

There are a group of registers which can be described as list registers. There are registers for the free list, normal priority command list, high priority command list, normal priority receive list, high priority receive list. Each will have start, size, head, and tail registers. The start and size registers will be set during initialization by software. Initially both the head and tail registers will be set to 0. The MPC will be continually updating the head register. The software will occasionally read the head register and set the tail register (not necessarily at the same time). From the perspective of the MPC the head pointer will always be current while the tail pointer may be stale (being stale does not mean that it cannot be used, it means that the current tail pointer may be old).

2.a. Free List Registers

The free list registers have a series of pointers associated with it. The start pointer points to the beginning of the free list. The start+size will point to the location just below the bottom of the free list. The head pointer indicates the location in memory where the hardware removes the entries from the list. This pointer is set by the hardware. The software will have to query the hardware to get this information. The tail pointer points to the next location that software will allocate new free list pointers. FIG. 14 shows the free list structure and its associated registers in the MPC and the free buffers in the SDRAM.

Free Head Register (0200)

This is an 11-bit register which holds part of the address of a pointer in the free buffer list 1400 (in SDRAM) which points to the next free receive buffer (in SDRAM 1401) to be loaded into the free list buffer (in MPC). The bottom 6 bits of the 32 bit address are not included because the free list entries are transferred in 16-word aligned blocks. The top 15 MSB's of the address are not included because it will never change and is specified by the free start register. The value of the free tail register must be 1 or more higher than the value of the free head register for the MPC to use the entries specified by the free head register. If they are equal it means that there are no valid entries available. If the free tail register is smaller than the free head register, it means that the free tail register must have already wrapped around the bottom of the free buffer list and started from the top again. This means that it is alright to transfer the pointers to the free buffers into the MPC's free buffer list. Reads to this register will behave differently than writes because during writes the entire 32 bits of the address will be valid. This address is generated by concatenating the bits [31:17] from the free start register, the merge of bits [16: 10] of the start with bits [16:10] of the free head, the bits [9:6] of the free head register and bits [5:0] are padded with 0's.

Free Tail Register (0204)

This is an 11-bit register which holds a portion of the address of a pointer in the free buffer list (in SDRAM) which will point to the next free buffer as determined by software. Like the free head register, the bottom 6 bits of the 32-bit address are not needed since software will be assigning 16 buffers at a time and the top MSB's of the address will not be needed since they will always be the same as the free start register. Once again, the reads to this register will behave differently than writes (see the free head register definition for additional information).

Free Start and Size Register (0208)

This is a 30-bit register which holds the 22 MSB's of the address of the top of the free buffer list (in SDRAM) and 8 bits of size information value of 00000001 will correspond to the minimum normal priority command list size of 256 entries, 00000010 corresponds to 512 . . . 10000000 corresponds to the maximum normal priority command list size of 32768.

Free Watermark 0 Register (020C)

This 11-bit register stores the count (x16) of valid entries in the free list below which the hardware will have different characteristics knowing that the number of entries in the free list is getting low. The MPC will start dropping medium and low reliability cells when the free buffers are less than the number indicated by this register.

Free Watermark 1 Register (0210)

This 11-bit register is similar to the free watermark 0 register; just replace "0" with "1". The MPC will start dropping low reliability cells when the free buffers are less than the number indicated by this register.

2.b. Command List Registers

The command list registers are very similar to the free list registers. Both need to get information off a list while keeping track of where to get the next element of the list and the location of the end of the list. For the command list registers a watermark register will not be necessary. (Thus generating the difference between the head and tail register will not be necessary, just an equality check to see if we are out of commands.) The MPC will assume that the software will update the command lists 4 commands (16 words) at a time. If the software cannot fill the 4 commands, it will put the null command in the next empty command field.

Normal Priority Command Head Register (0214)

This 11-bit register is identical to the free head register; just replace "free" with "normal priority command."

Normal Priority Command Tail Register (0218)

This 11-bit register is identical to the free tail register; just replace "free" with "normal priority command."

Normal Priority Command Start and Size Register (021C)

This 30-bit register id identical to the free start and size register; just replace "free" with "normal priority command."

High Priority Command Head Register (0220)

This 11-bit register is identical to the free start and size register; just replace "free" with "high priority command."

High Priority Command Tail Register (0224)

This 11-bit register is identical to the free start and size register; just replace "free" with "high priority command."

High Priority Command Start and Size Register (0228)

This 30-bit register is identical to the free start and size register; just replace "free" with "normal priority command."

Normal and High Priority Command Head Register (022C)

This 22-bit register holds the contents of both the normal priority command head register and high priority command head register. This is to allow transfers of the command head registers in one 1-word transfer. This register is a "phantom" register which points to the two "real" registers which actually holds the information.

Normal and High Priority Command Tail Register (0230)

This 22-bit register holds the contents of both the normal priority command tail register and high priority command tail register. This is to allow transfers of the command tail registers in one 1-word transfer. This register is a "phantom" register which points to the two "real" registers which actually holds the information.

2.c. Receive List Registers

The receive list registers are similar to the command list registers. Hardware writes the receive list entries to the location pointed to by the receive tail register. The receive list register's head register is not needed because software will never give hardware enough receive list entries for the tail to over-run the head. The receive list tail register must have a higher resolution than the other list tail registers since there will no longer be requirement of the 16 word transfers.

Normal Priority Receive Tail Register (0234)

This is an 11-bit register which holds a portion of the address of a pointer in the normal priority receive list. The top 15 bits of the 32 bit address are not needed since they will be the same as the normal priority start register. The bottom 3 bits are not needed since they will always be 0 since the descriptors to the receive buffers will always be sent in 2 word increments. This register will wrap around back to 0 when it has exceeded the size of the list.

Normal Priority Receive Start and Size Register (0238)

This is a 32-bit register which holds the 22 MSBs of the address of the beginning of the normal priority receive list space (in SDRAM) and 8 bits of size information. A size value of 00000001 will correspond to the minimum normal priority command list size of 256 words, 00000010 corresponds to 512 . . . 10000000 corresponds to the maximum normal priority command list size of 32768 words.

High Priority Receive Tail Register (023C)

This 14-bit register is identical to the normal priority receive tail register; just replace "normal priority" with "high priority."

High Priority Receive Start and Size Register (0240)

This 30-bit register is identical to the normal priority receive start and size register; just replace "normal priority" with "high priority."

Receive Buffer Size Register (0244)

This 8-bit register (N) holds the information about the size of the receive buffers in the SDRAM. The size of the buffer will be N*64 bytes except when N=0. When N=0 the size of the buffer is 16348 bytes. Table 3 provides the encoded values stored in the register and the corresponding size represented by that encoded value.

TABLE 3

Receive Buffer Size Register Decode

| Encoded Value | Size of Buffer in Bytes |
| --- | --- |
| 00000001 | 64 |
| 00000010 | 128 |
| 00000011 | 192 |
| 00000100 | 512 |
| ... | ... |
| 11111110 | 16256 |
| 11111111 | 16320 |
| 00000000 | 16384 |

3. Miscellaneous Registers

Intermediate Bus Error Status Register (0248)

This 32-bit register holds the error status information.

TABLE 4

Error Status Register

| bits | Decription |
| --- | --- |
| 0 | This bit indicates that a Core bus time out occurred. |
| 1 | This bit indicates that a backoff retry sequence was not successful. |
| 7:4 | These bits indicate a parity error occurred on data sourced from the Core bus. If these bits are set in may be in tandem with bit 9 (processor read) or Core bus agent write. |
| 8 | This bit indicates that and address parity error occurred |
| 9 | This bit indicates whether the last cycle that had and error was a writed from another device or by a read by this device. |

Miscellaneous Register (024C)

This 7-bit register holds the txe, rxe, pxe, cmd_check_enable, set_cb_reset_reg_, cb_master_reg, and loopback_thru_cb bits having the functions described in Table 5 below.

TABLE 5

Receive Buffer Size Registers

| Bit | Name | Description |
| --- | --- | --- |
| 0 | loopback_thru-cb | 1 means that loopback occurs through the Core bus interface, 0 means that the Core bus interface is bypassed. |
| 1 | cb_master_reg | 1 indicates that this MPC is the master of the Core bus. |
| 2 | set_cb_reset_reg | If this bit is set, it will source a cb_reset. |
| 3 | cmd_check_enable | If this bit is set, error checking on the commands will be enabled. |
| 4 | pxe | This bit indicates whether the last cycle that had an error was a write from another device or a read by this device. |
| 4 | rxe | This bit is the receive enable. If it is set then the MPC willing to accept data transfers. |
| 4 | txe | This bit is the transmit enable. If it is set then the MPC is able to send data transfers |

UART Registers

The uart_register function provides a path for "out-of-band" communication between cards across the corebus. This feature requires software driver support (call it a remote monitor function, or whatever). Another card may access registers in the MPC's corebus init space. The local processor also has access to this register set, facilitating board-level communication.

4. Pointer Lists and Address Fields

Pointer lists and memories reside within the MPC. Three types of pointer lists exist: the command list, the free list, and the receive list. These lists allow software to communicate to hardware the whereabouts of various buffers within SDRAM.

The SDRAM memories within the MPC, aside from the cached pointer lists, provide a storage area for inbound and outbound data as well as address buffer locations.

Each cell transferred over the bus has an address field. The information within these fields relates to information software supplies to the hardware via the command list.

The pointer lists and memory structures of the MPC as well as information contained in a cell address field are outlined below.

4.a. The Pointer Lists

The Command List

The command list consists of an array of four-word entries stored in SDRAM which contain instructions from the software to the hardware. The instructions may ask hardware to gather, pack, and move data between SDRAM and COX shared memory, source an interrupt or event to the bus, or read/write a word of data to bus I/O or memory space. A portion of the command list will be cached within the MPC. The cache spans two groups of 2×16×32 bits.

The possibility exists for three types of command list entries. One type of command list entry points at data in a message fragment buffer for incorporation into a message transfer. A cell which is part of a message transfer is prepended with a message address field. The second type of command list entry points at data in a non-message fragment buffer for incorporation into a non-message transfer. A non-message transfer cell uses a non-message address field as its prepended cell header. The third type of transfer is a type of non-message transfer except in this case there is no fragment buffer. One word of data is written to the bus memory or I/O space. The word for writing is actually specified within the command list entry. These transfers are called embedded-data transfers. Embedded-data transfers, being a type of non-message transfer, use non-message address fields as their prepended cell header.

Table 6 below shows the first six bits in a command list entry given a particular type of transfer. FIG. 9 gives a short description of each type of transfer. Tables 7 and 8 state the meaning of the Destination and Source Code bits in Table 6. These bits indicate whether data is transferred to/from the I-Bus/system bus and whether the transfer is in memory space or in I/O space. It is intended that CBIO WRITE and CBMEM WRITE (the embedded-data transfers) move only one word at a time onto the bus. Therefore, no source address is needed and the data to be written may be imbedded in the command list in place of the source address. This is indicated with a source address code of 2'b00.

Special care must be taken when a command list entry specifies the movement of data with a destination address in local SDRAM. Software needs a reliable method for determining that type of transfer has actually completed (the data is actually in local SDRAM). To do this, the MPC hardware will automatically block command list processing (not bump the head pointer) until data bound for SDRAM via a non-message transfer has successfully flushed across the ibus. Also, any event associate with this entry (specified by a command list notify bit; see below) will not be sent until the write to SDRAM is completed. This allows the software event handler to read head pointers to determine which entries are actually complete once an event is received (since there could be several entries causing events quite close together, head pointer management is critical).

TABLE 6

Allowed Command List Transfers

| Transfer | Type | C | Dest. Code | Dest. Code | Src. Code | Src. Code | |
|---|---|---|---|---|---|---|---|
| MSG XMIT | 1 | 0 | 1 | 0 | 0 | 1 | msg transfer |
| SMA READ | 1 | 0 | 0 | 1 | 1 | 1 | msg transfer |
| SMEM READ | 0 | 0 | 0 | 1 | 1 | 1 | non-msg trans |
| SMEM WRITE | 0 | 0 | 1 | 1 | 0 | 1 | non-msg trans |
| MEM MOVE | 0 | 0 | 0 | 1 | 0 | 1 | non-msg trans |
| CELL XMIT | 1 | 1 | 1 | 0 | 0 | 1 | msg-transfer |
| CBIO READ | 0 | 0 | 0 | 1 | 1 | 1 | non-msg trans |
| CBIO WRITE | 0 | 0 | 1 | 0 | 0 | 0 | embedded-data trans |
| CBMEM WRITE | 0 | 0 | 1 | 1 | 0 | 0 | embedded-data trans |

TABLE 7

Source Codes

| | Source Code | Source Code |
|---|---|---|
| Word 1 = DATA | 0 | 0 |
| I-Bus Memory Space | 0 | 1 |
| CB I/O Space | 1 | 0 |
| CB Memory Space | 1 | 1 |

TABLE 8

Destination Codes

| | Destination Code | Destination Code |
|---|---|---|
| Illegal Code | 0 | 0 |
| I-Bus Memory Space | 0 | 1 |
| CB I/O Space | 1 | 0 |
| CB Memory Space | 1 | 1 |

Command List Priorities

Two command list caches exist within the MPC. Servicing priorities between the two lists varies: normal priority (HTQ: high-throughput queue) and high priority (HRQ: high-reliability queue).

Normal Priority Command List (software: HTQ)

The normal priority command list resides in SDRAM. Thirty-two words from this list may be cached in SRAM in the MPC ASIC normal priority command list buffer. Entries written by software to this list receive the lowest priority attention in regards to hardware processing. This list may contain pointers to both message and non-message fragment buffer entries as well as hold embedded-data transfer instructions.

High Priority Command List (software: HRQ)

As with the normal priority command list, the high priority list also resides in SDRAM. Thirty-two words of this list may be cached in SRAM in the MPC ASIC high priority command list buffer. Entries written by software to this list receive a higher priority attention by hardware than entries on the normal priority list. This list may also contain pointers to both message and non-message fragment buffer entries as well as hold embedded-data transfer instructions.

Command List Entries

Command List Entry—Message Fragment Buffer

Figure 15:
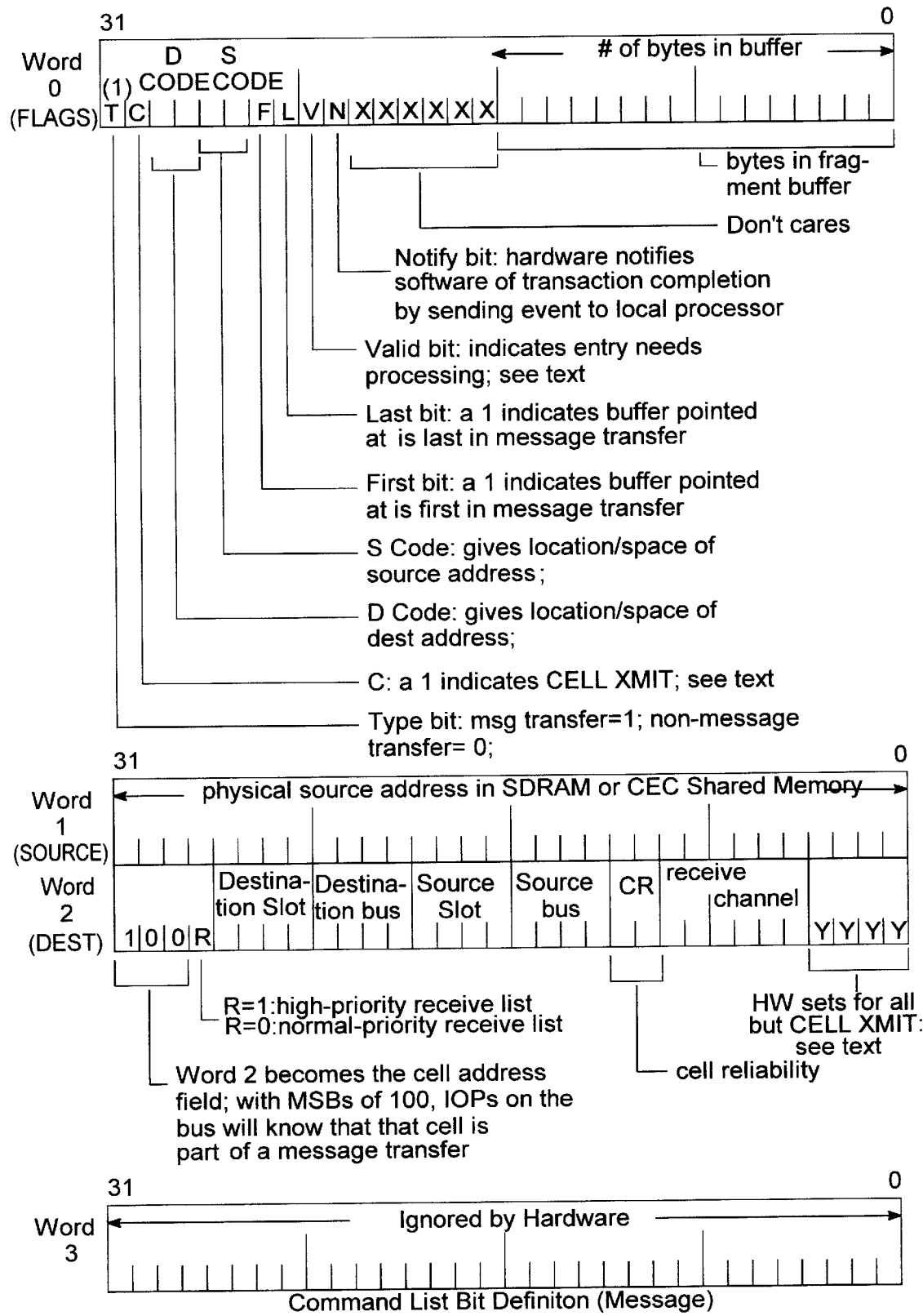
FIG. 15 illustrates the command list bit definition for a message type transfer.

FIG. 15 defines the bits in a command list entry pointing at data which will become part of a message transfer.

A description of the fields found in FIG. 15 follows:

The T in bit 31 of Word 0 stands for Type. If Type is set to a one, the command list entry specifies a message transfer; if type is set to a zero, the command list entry specifies a non-message transfer.

The C in bit 30 of Word 0 indicates to hardware that this particular command list entry specifies a CELL XMIT transfer. Hardware will know not to change the "Y" bits in Word 2 but to copy them directly to the message address field.

The D CODE[29:28] of Word 0 indicate to hardware whether a transfer is destined for the bus of the ibus and whether or not that transfer is in I/O space or memory space. These bits refer to the address in Word 2, the destination address.

The S CODE[27:26] of Word 0 indicates to hardware whether the data transfer is sourced from the system bus or the ibus and whether the address is in I/O space or memory space. In the case of an embedded-data transfer, these two bits will indicate that the data to be written is held in Word 1. These bits, then, refer to the address in Word 1, the Source Address field.

F stands for First in bit 25 of Word 0. If the memory location to which this command list entry points is the first buffer in a series of buffers which will combine to form one data transfer, then F will be set to a one. Otherwise, F will be zero.

Likewise, the L in bit 24 of Word 0 stands for Last. If the buffer to which this command list entry points is the last in a series of buffers which combine to form one data transfer, then L will be set to a one. Otherwise, L will be zero.

The V in bit 23 of Word 0 holds the valid bit. This bit indicates that a command list entry requires hardware processing. (V=1 indicates processing needed; V=0 indicates processing not needed). If a particular command list entry shows a valid bit of V=0, hardware will assume that the remaining command list entries in the same cell are also invalid. Hardware will resume valid-bit checking at the beginning of the next cell of command list entries.

The lower two bytes in Word 0 contain the number of bytes of data in the buffer to which this command list entry points.

Word 1 specifies the physical memory address where the data buffer resides. This address may be either local SDRAM or shared memory on the COX card.

The top 28 bits of Word 2 contain fields which are bit-aligned to those in the message address field. The hardware will append the bottom four bits to this 28-bit field thereby creating the message address for all transfers besides the CELL XMIT. In this case, whatever software specifies in the command list entry will be directly copied into the message address field. The individual fields in Word 2 are described in detail with reference to FIG. 44.

Word 3 will not be processed by the MPC ASIC.

Command List Entry—Non-Message Fragment Transmit Buffer

Figure 16:
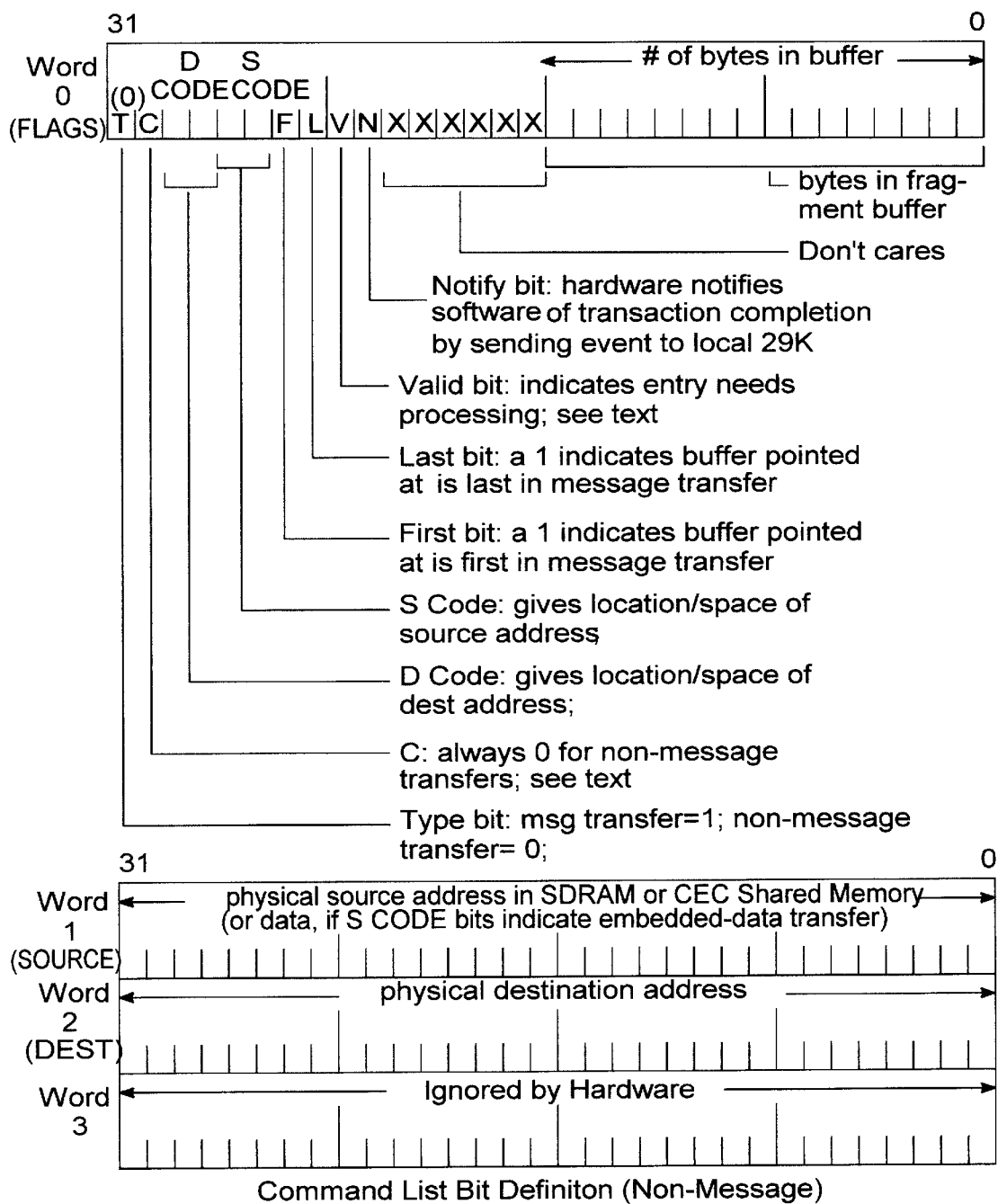
FIG. 16 illustrates the command list bit definition for a non-message type transfer.

FIG. 16 defines the bits in a command list entry pointing at data which will become part of a non-message transfer.

The command list entry for a non-message data transfer resembles that of a message transfer. Note that the Type bit (Word 0, bit 31) will be set to zero for a non-message transfer and Word 2 will be a physical memory location in SDRAM or shared CEC memory. The other fields in FIG. 16 remain the same as those of FIG. 15.

Recall that an embedded-data transfer is really a type of non-message transfer (meaning that the Type bit—bit 31, Word 0—is set to 0). An embedded-data transfer may be distinguished from other types of non-message transfers by decoding the S CODE bits which will be set to 2'b00. With this type of transfer, Word 1 will contain the data for writing instead of a physical source address.

Command List Transfers

This section summarizes the types of transfers initiated by command list entries as introduced with reference to FIG. 9 above. The information given below for each type of transfer refers to fields found in the command list entry as described above. Write and read are in relation to the bus, i.e., one writes to the bus or one reads from the bus.

Message Transfers

The following transfers are referred to as message transfers because their destination address is in message format (Word 2 of command list entry). Address decoding maps bus I/O space addresses 0x(8 or 9)XXXXXXX as message addresses. The S CODE bits within the command list flags indicate whether to retrieve the source data from the core bus or from the I-Bus.

MSG XMIT

A MSG XMIT transfer request on the command list asks for the transfer of data from the SDRAM of the local IOP to the SDRAM of another IOP. The command list entry points to a message fragment transmit buffer.

Word0[31:26]=6'b101001

Source address (Word 1)=local SDRAM: 0x9XXXXXXX (I-Bus memory space)

Destination address (Word2)=message address: 0x(8 or 9)XXXXXXX (system bus I/O space)

SMA READ

This type of transfer moves data from shared memory on the CEC to local SDRAM on the IOP. Data is massaged by the MPC to resemble a MSG XMIT transfer, i.e., incoming data is prepended with a message address field so hardware will utilize the receive list for notifying software of data entry.

Word0[ ]31:26]=6'b100111

Source address (Word 1)=COX shared memory: 0xXXXXXXXX (system bus memory space; limited by 4 MB of addressable memory on COX)

Destination address (Word 2)=message address: 0x(8 or 9)XXXXXXX (system bus I/O space)

CELL XMIT

A CELL XMIT data transfer is much like a MSG XMIT except software has explicit control over the message destination address and may only transmit up to sixteen words per command list entry (one cell). This implies that hardware will not alter the bottom four bits of Word 2 in the message fragment buffer command list entry when placing them into the message address field. This type of transfer is used for diagnostic purposes only. Note that bit 30 of Word 0 in the command list entry will be set to C=1 as an indication to hardware that the entry is a CELL XMIT entry.

Word0[31:26]=6'b111001

Source address (Word 1)=local SDRAM: 0x9XXXXXXX (I-Bus memory space)

Destination address (Word 2)=message address: 0x(8 or 9)XXXXXXX (system bus I/O space)

Non-Message Transfers

The following transfers are referred to as non-message transfers because the destination address of each command list entry refers to a physical location in either local SDRAM or COX shared memory.

SMEM WRITE

This transfer moves data from the SDRAM of the local IOP to shared memory on the COX.

Word)[31:26]=6/b001101

Source address (Word 1)=local SDRAM: 0x9XXXXXXX (I-Bus memory space)

Destination address (Word 2)=shared memory: 0xXXXXXXXX (bus memory space; limited by 4 MB of addressable memory on COX)

SMEM READ

The SMEM READ data transfer moves data from shared memory on the COX to local SDRAM on the IOP. Data bypasses receive list mechanism in the MPC and is written directly to SDRAM.

Word0[31:26]=6'b000111

Source address (Word 1)=COX shared memory: 0xXXXXXXXX (bus memory space; limited by 4 MB of addressable memory on COX)

Destination address (Word 2)=local SDRAM: 0x9XXXXXXX (I-Bus memory space)

MEM MOVE

This type of transfer moves data out of and back into local SDRAM on the IOP. Data transfer, therefore, bypasses the bus.

Word0[31:26]=6'b000101

Source address (Word 1)=local SDRAM: 0x9XXXXXXX (I-Bus memory space)

Destination address (Word 2)=local SDRAM: 0x9XXXXXXX (I-Bus memory space)

CBIO WRITE

This type of non-message transfer is termed an embedded-data transfer since one word of data is written to the bus memory space by placing this data in Word 1 of the command list entry.

Word0[31:26]=6'b001000

Source address (Word 1)=data for writing (unrestricted)

Destination address (Word 2)=bus I/O space: 0xXXXXXXXX

CBMEM WRITE

This type of non-message transfer is termed an embedded-data transfer since one word of data is written to the bus memory space by placing this data in Word 1 of the command list entry.

Word0[31:26]=6'b001100

Source address (Word 1 )=data for writing

Destination address (Word 2)=COX shared memory: 0xXXXXXXXX (memory space; limited by 4 MB of addressable memory on COX)

The Free List

The MPC must place data entering an IOP into the SDRAM. The software communicates to the hardware locations in SDRAM where data may be placed. These locations are called receive buffers. The free list consists of one-word elements which point to the receive buffers. The length of the receive buffers is fixed at N*64 bytes where N∈(1, 2, . . . , 256). Each receive buffer is 64-byte aligned. The specific length used is latched in a register called receive buffer size.

Thirty-two 26-bit entries reside in the free list in the MPC arranged as two 16×26 bit, dual-ported SRAMs. Entry data are cached from the full free list held in SDRAM.

The Receive List

Standard Receive Mode (RXE=1; PXE=0)

After hardware finishes loading incoming data into receive buffers as allocated by the free list, the data becomes ready for processing by software. The hardware informs the software that a receive buffer needs attention by placing a pointer to that receiver buffer, as well as other information, onto one of two receive lists. One receive list indicates data needing normal-priority attention and the other receive list indicates data needing high-priority attention. As with the command list and the free list, the entire receive list resides in SDRAM. The MPC buffers receive-list data in four, dual-ported, 16×32 bit SRAMs. Two of these SRAMs are dedicated to normal-priority entries and two are dedicated to high-priority entries.

The following describes the entries shown in the receive list bit definition:

If the start bit (Word 0, bit 31) equals one, then the particular buffer pointed to by this receive list entry is the first buffer in a series of buffers which form a message.

Likewise, if the end bit (Word 0, bit 30) equals one, then the particular buffer pointed to by this receive list entry is the last buffer in a series of buffers which form a message. Note that this implies that if neither bit 31 or bit 30 is set to one, then the buffer pointed to by the receive list entry is a middle buffer. If both bits 31 and 30 are set to one, then the message is one buffer in length.

Bits 16 through 23 contain the count field indicating how many cells are stored in a particular receive buffer.

Bits 10 through 15 determine the channel over which the IOP received the message. Each incoming message is granted a channel number unique during its transmission time.

Bits 6 through 9 relate to error checking. Bit 0 will be set to one by hardware if any type of error occurs during the transmission of the message. Bit 1, labeled seq, equals one if the error which occurred during transmission is a cell sequence error, i.e., cells were lost, duplicated, or rearranged. Likewise, bit 2 corresponds to a parity error and bit 3 is currently reserved for a future error status indicator.

Word 1 points to the location in SDRAM corresponding to the first byte of the receive buffer. Note that since all receive buffers in SDRAM are 64-byte aligned, only 26 bits are required to specify the receive buffer address.

Promiscuous Receive Mode (RXE=X; PXE=1)

During promiscuous receive mode all bus cycles are captured by the MPC. Via the receive list, hardware will convey to software the bus address, the bus byte count, the MEM/IO bit, an error bit, and the location of the receive buffer in SDRAM.

The bits in this entry are defined as follows:

Word 0 holds the address read off the bus during the address phase of the bus cycle.

Word 1[31:6] holds the top twenty-six bits of the receive buffer location in SDRAM where the data associated with this bus cycle has been written. Note that receive buffers are 64-byte aligned in SDRAM therefore the bottom six bits of the address are zero.

Word 1 [5:3] indicates the byte count read off the bus.

Bit 2 of Word 1 is the memory bit from the bus indicating whether data transfer is in either bus memory space; (mem=1) or bus I/O space (mem=0).

Bit 0 of Word 1 will be set to one if an error occurs during the bus cycle.

4.b. The Cell Address Field

Since the command list dictates the formation of cells traversing the bus, the address field associated with each cell is intimately related to information found on the command list. The address field on a cell destined for the bus varies with the type of data transfer. MSG XMIT, SMA READ, and CELL XMIT use message address fields. SMEM WRITE, SMEM READ, MEM MOVE, CBIO READ, CBIO WRITE, and CBMEM WRITE use non-message address fields.

The Message Address Field

Figure 17:
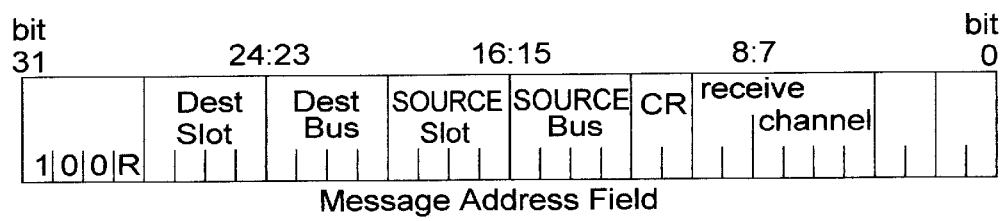
FIG. 17 illustrates the message address field for a message transferred on the bus.

FIG. 17 defines the bits found in the one-word message address field, as explained below.

Any cell which has the upper nibble of its header set to 8 (1000) or 9 (1001) will be identified as a cell which is part of a message.

The R in bit 28 indicates to which receive list the cell should be directed. A value of "1" indicates the high-priority receive list (HRQ) and a "0" indicates the low-priority receive list (HTQ).

Bits 24 through 27 define the destination slot. The cell routes to this physical slot in the chassis.

Bits 20 through 23 indicate the bus over which the message will be routed.

Bits 16 through 19 define the source slot. The cell originates from this physical slot in the chassis.

Bits 12 through 15 indicate the bus over which the message originated.

Bits 10 and 11 show cell reliability. The cell reliability bits work against two watermark registers, implementing three levels of reliability for bus messaging as shown in Table 9.

TABLE 9

MSG address cell-reliability bit definition

| cell reliability [1:0] | reliability | loss condition |
|---|---|---|
| 00 | hi | no free buffers |
| 01 | medium | free buffers less than watermark 0 |
| 10 | low | free buffers less than watermark 1 |
| 11 | rsvd | no receive activity |

Bits 4 through 9 determine the channel over which an IOP is receiving a message. Each incoming message is granted a channel number unique during its transmission time.

A one in bit 3 indicates that this is the first cell in a message.

A one in bit 2 indicates that this is the last cell in a message.

Bits 0 and 1 allow room for a sequence number applied to each cell in a message. Cell sequencing takes place module 4.

The Non-Message Address Field

Cells which combine to form a non-message data transfer use physical memory locations in SDRAM or COX shared memory for their address fields.

III. INTERPROCESSOR MESSAGING SYSTEM (IMS)

The system description and message passing controller technique described above supports a very flexible and scalable architecture for the router, with the distributed protocol modules on intelligent I/O modules, centralized resources shared by all the I/O modules, and the ability to provide data link layer processing for basic input/output modules on the system. This ensures backward compatibility as well as flexibility and scalability for the system.

Figure 18:
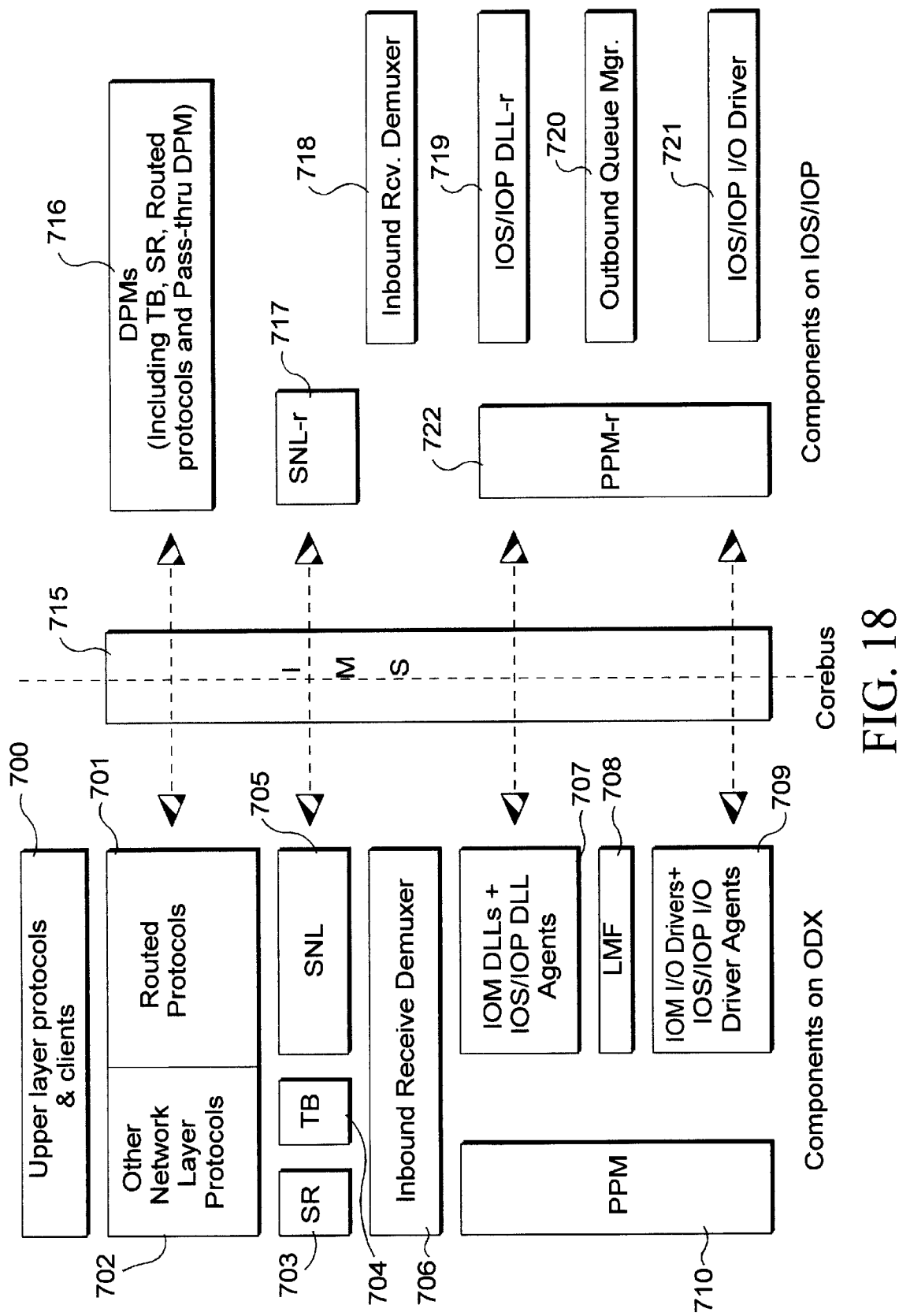
FIG. 18 is an overview of the major components in the centralized internetworking engine and the intelligent input/output modules according to the present invention.

FIG. 18 provides highlights of major functional components of the software according to one embodiment of the present invention as distributed on the centralized processor COX and the intelligent input/output system IOS, which communicate at a logical layer by means of an interprocessor messaging system IMS 715.

In FIG. 18, flow within each processor, either the COX or the IOS/IOP can be considered vertical in the figure, while communication between the units is primarily horizontal and peer-to-peer. Thus, on the central networking resource COX, software for upper layer protocols is illustrated in block 700. The routed protocols are represented by block 701, with other network layer protocols 702 supported as necessary. Below the routed protocols 701, are the source routing resources 703, transparent bridging resources 704, and the SNL support 705.

The SNL is the sub-network layer which handles parsing of headers to determine the next layer of protocol, dispatching of packets to appropriate higher layer protocol handles, protocol dependent transmit routines to add/update and replace sub-network layer headers including MAC headers for LAN ports, and headers for serial ports according to such protocols as PPP, FR, X.25, and SMDS.

Below the SNL support 705, transparent bridging 704 and source routing 703 are found the inbound receive demultiplexing resources 706. These resources direct the packets received from the lower layers into the appropriate upper layer modules. On the COX, the data link layer servers for the IOM input/output modules without remote intelligence are provided. Also, data link layer agents for the intelligent I/O modules are supported (block 707). Also, a link management function module LMF 708 provides queuing services for serial interfaces. The I/O drivers which support network events on the basic input/output modules, and the I/O driver agents which provide services to the I/O drivers on the intelligent input/output modules such as the IOS and IOP are also included on the centralized processor in block 709. A port and path manager PPM 710 is included, which handles mapping between logical ports and physical paths. These modules communicate with resources distributed across the interprocessor messaging system IMS 715 to components located on the input/output modules. For the IOS or IOP modules with intelligent resources located on card, they communicate with the modules illustrated in FIG. 22. Thus, in the upper layer distributed protocol modules 716 are found, which include transparent bridging, source routing and routed protocol support, and also pass through resources so that packets not supported locally can be passed through the IMS 715 to the centralized processor. A SNL remote driver 717 is also included on the IOS/IOP. The distributed protocol module 716, and the SNL remote driver 717 receive data through the inbound demultiplexer 718. The data link layer resources 719 which are executed on the remote devices supply the inbound receive demultiplexer 718. An outbound queue manager 720 is used for managing transfers out of the local card. I/O drivers 721 drive the input/output devices coupled to the IOS/IOP card. A port and path manager PPM 722 for the remote device is also included on the remote card.

The interprocessor messaging system (IMS) 715 provides a logical platform which allows communication between the central resource COX and a wide variety of remote resources across the common logical layer interface. Thus, the intelligence of the cards within the routing system can be varied and flexible as suits the need of particular installation.

Figure 19:
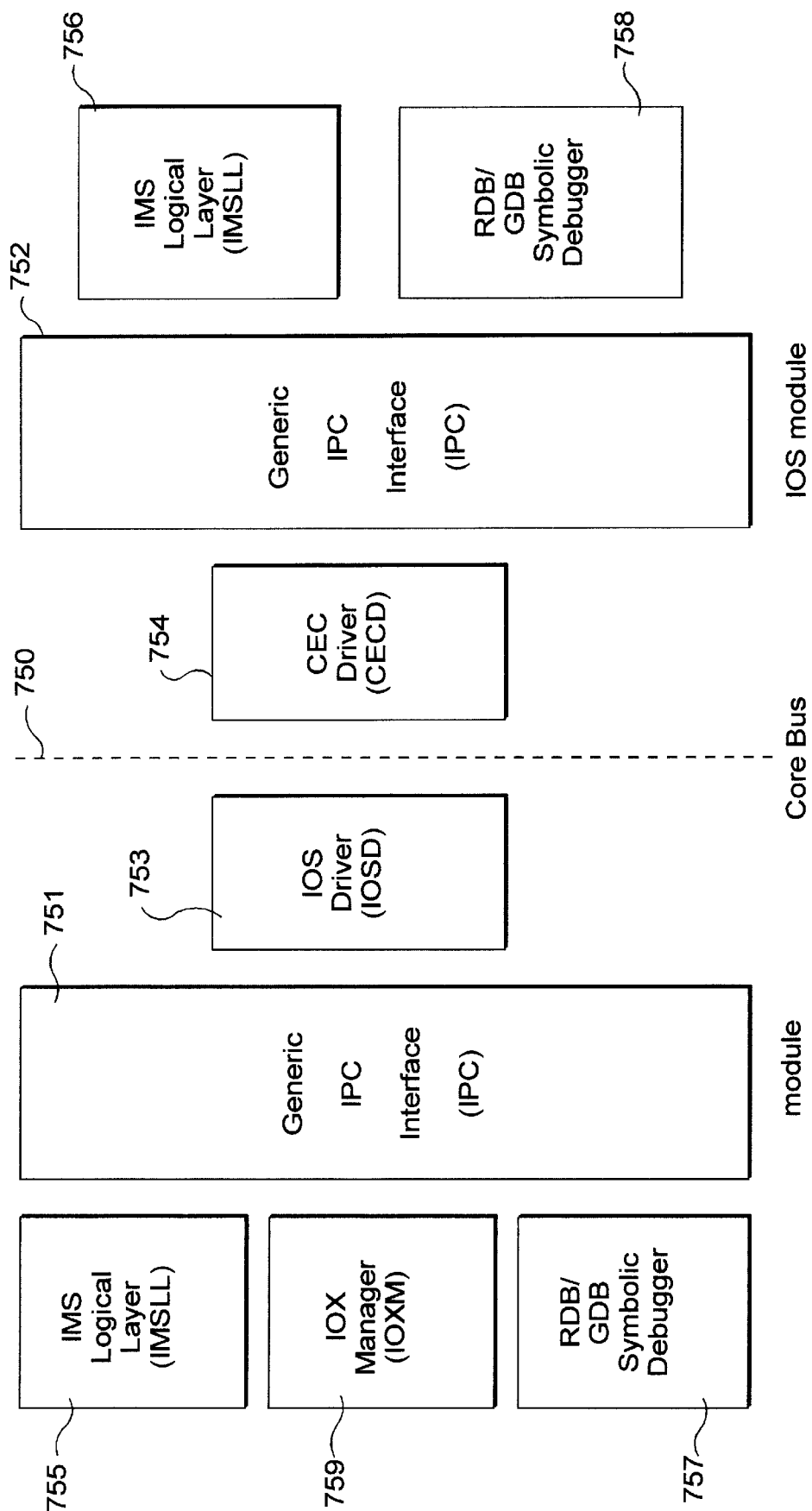
FIG. 19 provides an overview of the interprocessor communication components for use in the system described in FIG. 18.

FIG. 19 breaks down the interprocessor messaging system into additional components which are centered across the core backplane bus represented by dotted line 750. A generic interprocessor communication service 751 for the central module, and a generic interprocessor communication service 752 for the remote module are provided. This service provides an interface to all other processor modules in the system. The generic IPC interfaces with one or more bus drivers 753 on the central side and one or more bus drivers 754 on the remote side. This way, communication between specific modules can be handled in the system. Also, the IPC interface 751/752 interfaces with one or more special services, such as the IMS logical layer 755 on the central side, and IMS logical layer 756 on the remote side. A debugging service 757 is found on the central side and 758 on the remote side. A board manager 759 on the central side provides centralized management of the remote modules.

The interprocessor messaging system logical layer module 755/756 is a significant part of the IPC services available. The IMS provides a message based interface between processor modules. An IMS subsystem on each processor module is composed of a logical layer that interfaces with client components, the physical layer that interfaces with external processor modules and a generic IPC layer between the two.

Figure 20:
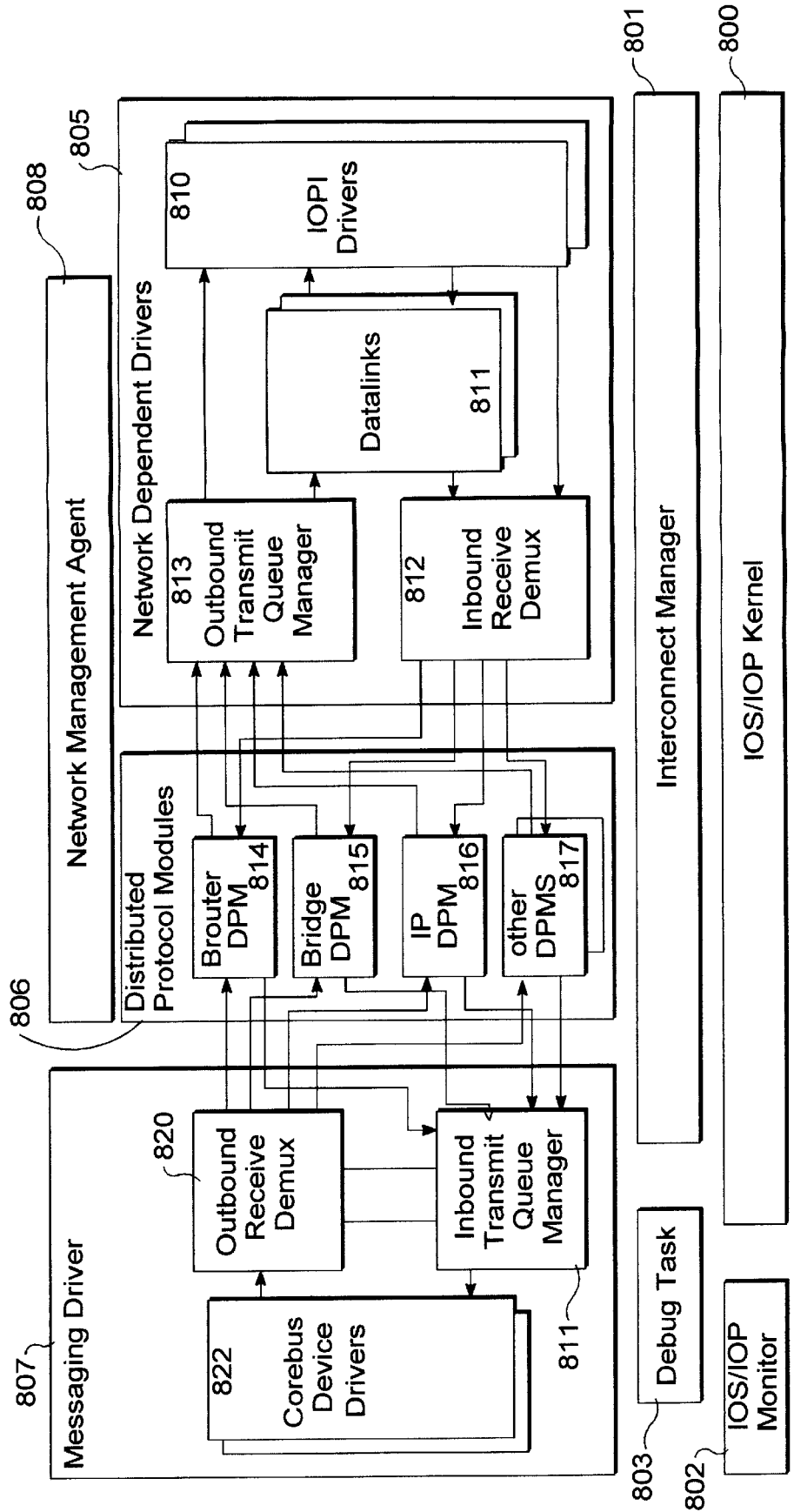
FIG. 20 provides a perspective of the data paths in the intelligent input/output modules for the system of FIG. 18.
Figure 22:
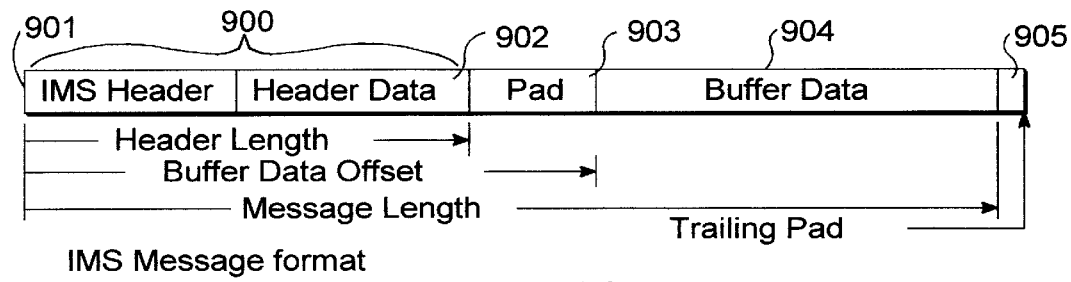
FIGS. 22 through 25 illustrate the message formats supported by the interprocessor messaging system according to one embodiment of the present invention.

FIG. 20 illustrates data paths on a remote input/output module such as an IOS or IOP. In FIG. 20, the remote system includes a basic kernel module 800 and an interconnect manager 801. A monitor module 802 and a debug task 803 may be provided for system management. The system includes a plurality of network dependent drivers 805, a plurality of distributed protocol modules 806, and a messaging driver 807. Also, a network management agent 808 may be included. The network dependent drivers 805 include physical network drivers (IOPI) 810, data link layer drivers 811, an inbound receive demultiplexer 812, and an outbound transmit queue manager 813.

The distributed protocol modules include the basic Brouter distributed protocol module 814, a bridge DPM 815, and internet protocol (IP) distributed protocol module 816, and other DPMs 817 as suits the particular implementation. The distributed protocol modules are coupled with the messaging driver 807 which includes an outbound receive demultiplexer 820, and an inbound transmit queue manager 821. Core bus drivers 822 are also included, coupled with the outbound and inbound paths for driving one or more core busses to which the device is connected. The messaging driver 807 implements the IMS layer modules as discussed above under the control of the interconnect manager 801.

The interprocessor messaging system is specifically designed to meet the needs of control and data-in-transit traffic patterns in the scalable, flexible distributed router system according to the present invention. For each message type, based on the traffic pattern anticipated for the system, an IMS message queue for high throughput or high reliability and IMS drop priority are assigned. The table shown in FIG. 21 is a summary of the various IMS message types according to one embodiment of the invention, their service requirements and the quality of service assigned to them as a result. Note that the drop priorities and other parameters associated with these messages can be modified to suit the needs of a particular environment.

In FIG. 21, HRQ stands for high reliability queue, and HTQ stand for high throughput queue.

Thus, the IMS offers three, or more, types of transport services—(1) high throughput service using the HTQ, (2) high reliability, low latency service using the HRQ, and (3) guaranteed delivery service also using the HRQ. For a given queue, the IMS guarantees that packets will be delivered on the recipient processor module in the same order in which they were supplied to the IMS. Messages in the HRQ are given priority over messages in the HTQ for transmit as well as receive processing. However, the volume of traffic on the HRQ is supposed to be substantially smaller than that on the HTQ. Hence, messages on the HRQ are processed in small numbers and messages on the HTQ are processed in large batches for better throughput.

On the transmit side, the IMS provides quality of service registration based on transmit list fullness thresholds in software to ensure fairness and protection against overloading by any one message type. Each IMS message type is assigned a drop priority. A message of a certain priority will be dropped from being added to transmit list if the count of empty command list entries is below an eligibility threshold (or watermark) set for that message priority. In other words, the quality of service is a transmit side drop mechanism to assure fair queuing. A message with the highest drop priority (lowest reliability class) will have high threshold for free transmit list entries and hence the highest probability of being dropped. A message with a lower drop priority (higher reliability class) will have a lower threshold for free transmit list entries and hence the lowest probability of being dropped. Quality of service registration is not required for message types using "guaranteed" service, because the message will not be dropped if any free entries are available in the transmit list.

On the receive side, the IMS demultiplexes a large batch of IMS messages into smaller batches by IMS message type and has a receive function invoked for each message type received. The IMS is responsible for converting buffer data type messages into buffer data and data areas, and collecting message cells and putting them together as a single chain of buffers and batching these buffer chains together by their message type. The IMS provides a variety of receive function registration services based on IMS message header type and IMS message type.

Each client provides a receive function that must be invoked for a specific message identification. When two clients register for the same message identification, with two different receive functions, the last registration takes effect. In order to ensure that no two clients assign the same values for two different message type symbols, all message type symbols must be centrally located in the header file in the IMS logical layer component. The reception of messages, whether on high throughput queue or high reliability queue, is transparent to clients. Registered receive function is invoked no matter which queue a message came in on. It is expected that a message is always sent on the same type of message queue.

The high throughput service and high reliability/low latency service are intended primarily for transport of buffer data, that is Buffer Data (BD) descriptors, and data pointed to by BD descriptors. The IMS message header type 0 is used to transport buffer data. Buffer data can be just a single buffer, a chain of buffers or a batch of chained buffers. IMS subsystem on the local processor will convert these buffers into messages and transfer the messages over to remote processors through the IMS. The data messages may be selectively dropped from, or refused entry in, the transmit queue, based on quality of service assigned to the message type. The IMS maintains statistics of messages transmitted, discarded, and failed.

Guaranteed message service is provided on top of high reliability, low latency IMS message service using the HRQ. Messages that could not be queued for sending will be queued internally for retrying at a later time instead of dropping. IMS guarantees that data supplied to local IMS subsystems will be delivered by the recipient IMS in exactly the same order in which is was supplied and without replication. In one preferred implementation, the retry attempts are made at a minimum rate of every 100 milliseconds.

The IMS message type header 02 is used for transport of kernel messages and header type 04 is used for transport of frame driver type messages. However, header types used by the IMS are not limited to these and may grow as suits the needs of a particular installation.

FIGS. 22 through 25 illustrate the IMS message and header formats. Each IMS message shown in FIG. 22 has a header, generally 900, which includes an IMS header 901 and header data 902. The header data 902 includes, for example, portions of a buffer descriptor for a frame in transit which sets out status information about the frame. A pad 903 may be used to fill in an area between the beginning of the packet and a buffer data offset. Buffer data is carried in the region 904 and may be padded with a trailing pad 905.

Figure 23:
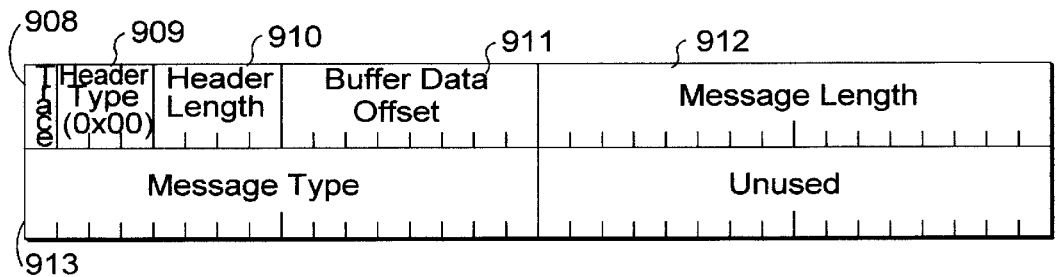
Figure 24:
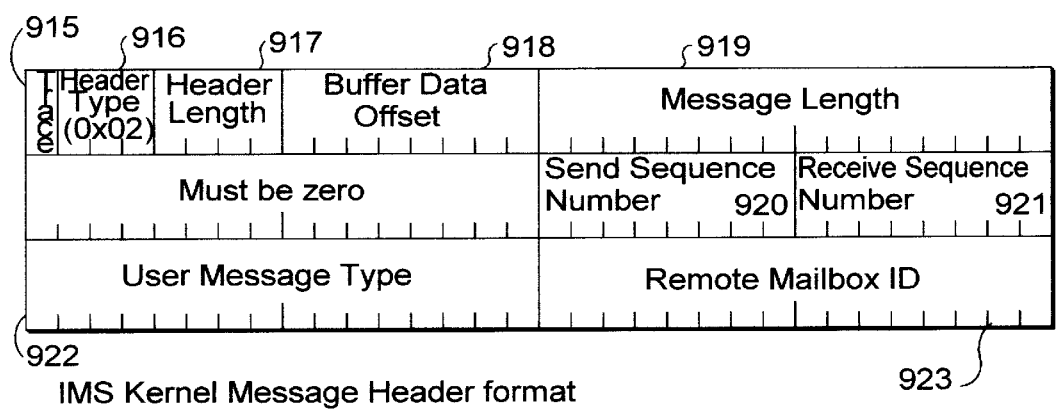
Figure 25:
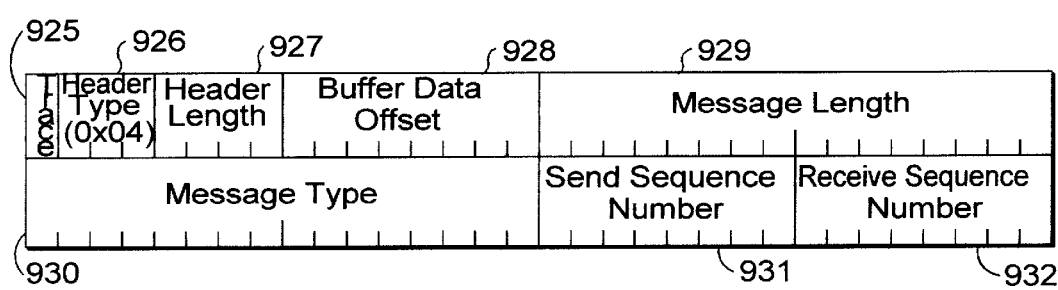

In one system, the IMS may support three categories of messages as shown in FIGS. 23, 24, and 25. Each of these messages have IMS headers with fields indicating the header type, the header length in words, the message length in bytes, and the buffer data offset in bytes at a minimum. In FIG. 23, the BD message header format includes a trace bit 908, a header type field 909, and a header length field 910. The buffer data offset is stored in field 911. A message length is specified in field 912. A message type is specified in field 913. The last segment is unused.

The IMS kernel message header format shown in FIG. 24 begins with a trace field 915, includes the header type field 916, and a header length 917. The buffer data offset is stored in field 918. The message length is stored in field 919. The next word must be all zeroes, followed by a sequence number field 920 and a receive sequence number 921. The next field identifies the user message type 922, and the last field provides a remote mailbox identification 923 for kernel messages.

FIG. 25 illustrates the IMS frame driver message header format. Again, this format begins with a trace field 925 and includes the header type field 926 and the header length field 927. The buffer data offset is provided at field 928. The message length is provided in field 929. The message type is set out in field 930. The last two fields provide the send sequence number, field 931, and the receive sequence number, field 932.

Figure 26:
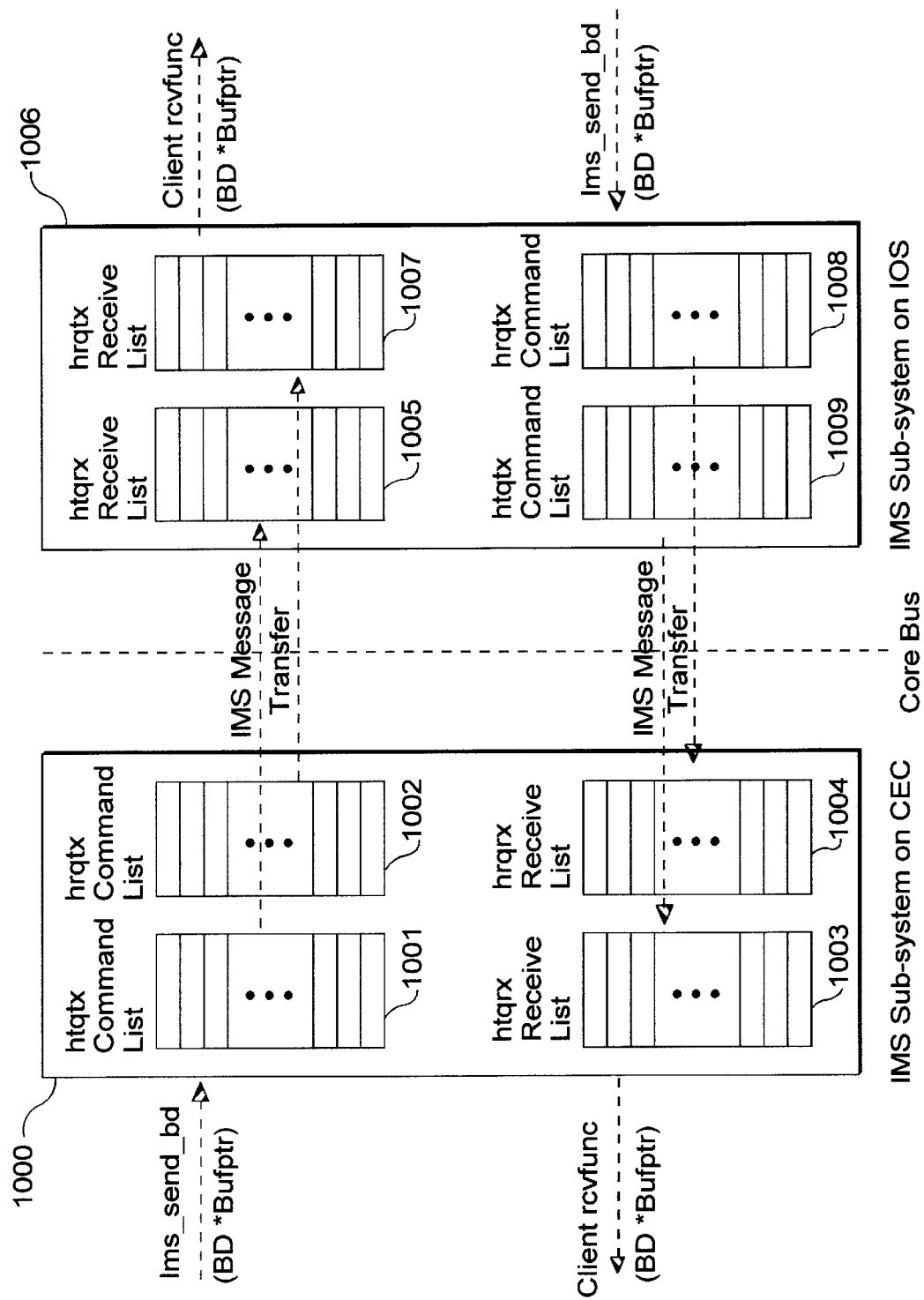
FIG. 26 shows the functional operation for the interprocessor messaging system buffer data type message transfers.

FIG. 26 summarizes the interprocessor messaging system using the two types of queues for buffer descriptor type messages. Thus, on the centralized processor, or another intelligent processor, illustrated at block 1000, a high throughput queue htqtx 1001 and a high reliability queue hrqtx 1002 for transmitting commands are provided. Also, a high throughput receive list queue htqrx 1003 and a high reliability receive list queue hrqrx 1004 are included. The send buffer descriptor command from the logical layer system for the interprocessor messaging system stores a command in the appropriate list. The high throughput queue sends the IMS message to the high throughput receive list 1005 on the destination input/output module 1006. Also, high reliability commands are transferred to the high reliability queue receive list 1007 on the remote device. A similar path exists from the high reliability command list 1008 and the high throughput command list 1009 on the remote device 1006. These messages are transferred to the high reliability and high throughput receive lists on the central processor, or another input/output processor depending on the destination of the packet.

Figure 27:
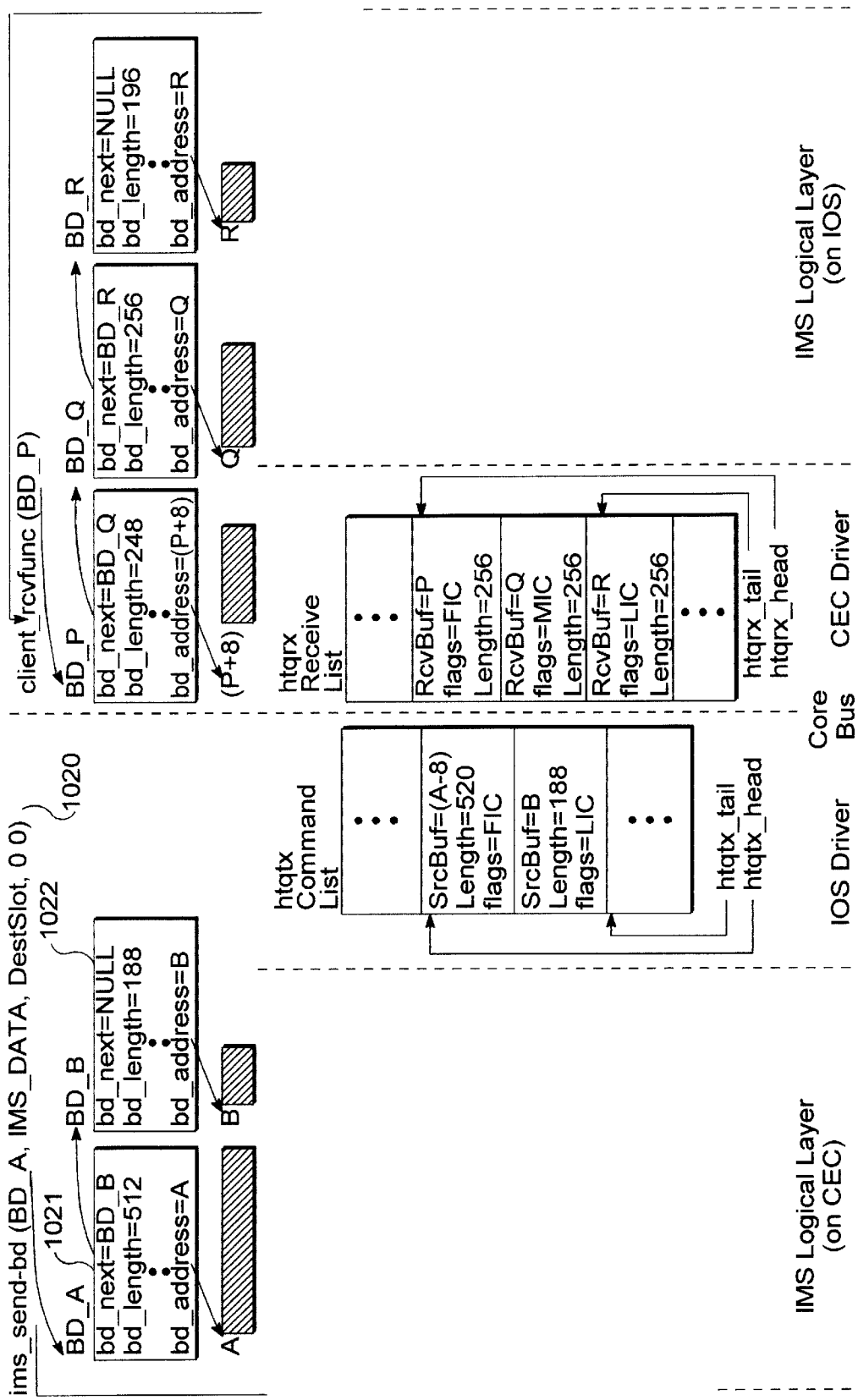
FIG. 27 shows the interprocessor messaging system logical layer processing for data transfers from the central engine to the input/output modules.
Figure 28:
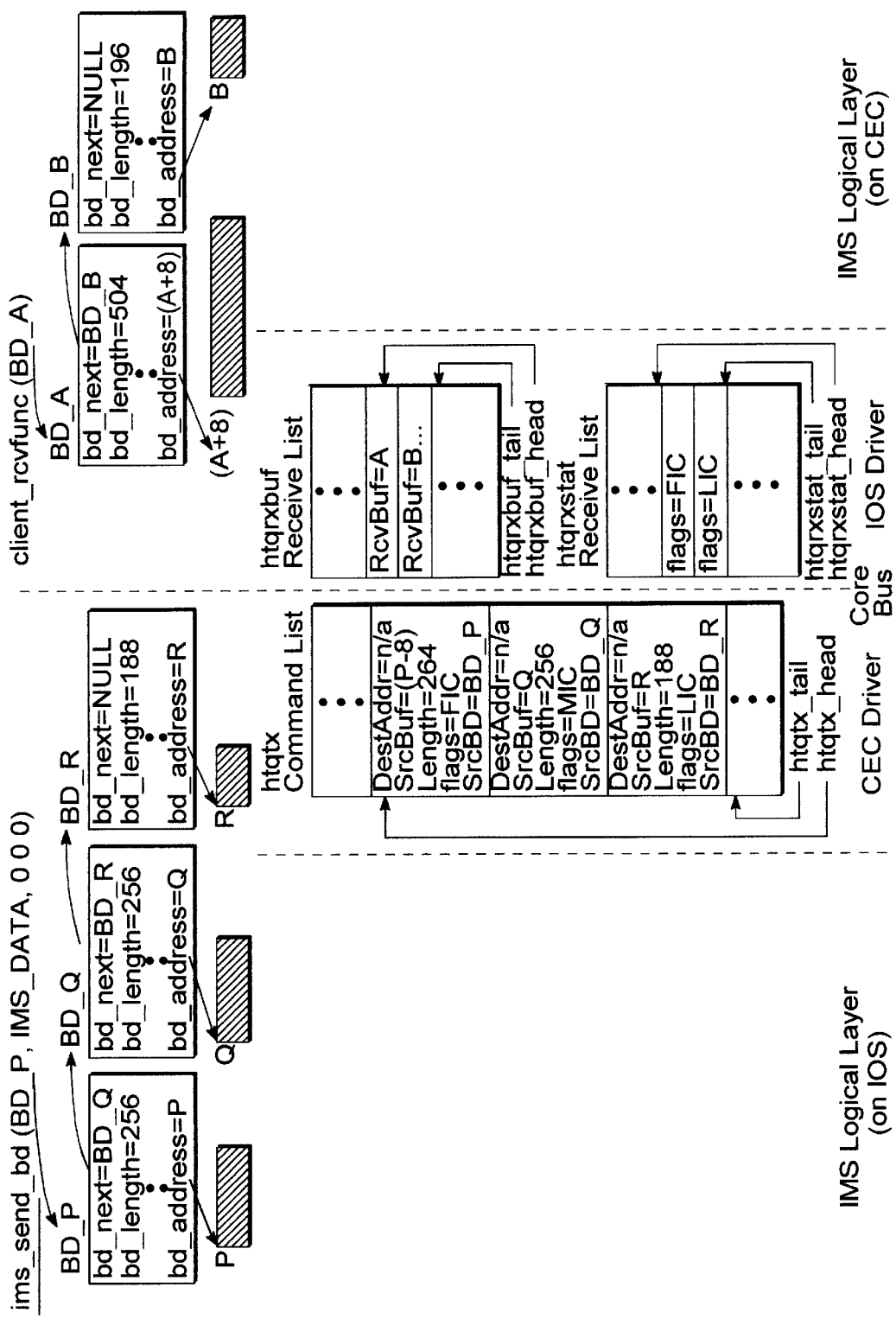
FIG. 28 shows the interprocessor messaging system logical layer processing for data transfers from an input/output module to central internetworking engine.

FIGS. 27 through 28 provide an example of the interprocessor messaging system logical layer processing for transfers from the central resource to a remote processor, and from the remote processor to the central resource respectively. Assuming that message buffers on the centralized resource are 512 bytes long and that buffers on the remote systems are 256 bytes long, the examples will operate as described. The sample message type is IMS data, the packet is 700 bytes long, and when transmitted through the interprocessor messaging system, a header of 8 bytes (assuming for this example that there is no header data (902 of FIG. 22)) is prepended without any additional padding to the message, thus the message size become 708 bytes. Thus, a message of size of 708 bytes is transferred over the high throughout queue from the central processor to the remote input/output module in FIG. 27, and from the remote input/output module to the central processor in FIG. 28.

Thus in FIG. 27, a logical layer issues a command (e.g. 1020) to send to the buffer descriptor beginning with buffer descriptor BD-A, with an IMS data message type to a destination slot 00. Thus, the buffer descriptor BD-A is accessed and includes the fields as shown at block 1021. The first line in the buffer descriptor BD-A is a pointer to the next buffer descriptor, buffer descriptor BD-B which includes the fields shown at block 1022. The 708 byte message thus includes a fragment in a buffer of length 512 bytes, and a fragment in a buffer of length 188 bytes. The address for the buffer data is stored in the descriptors as shown.

For all the fragments in a message, the message header is prepended preceding the data buffer of the first fragment the desired data offset, and the address of the start of the IMS message header is set. Thus, the message type is IMS data, the message header size is 8 bytes, the data offset within the message is 8 bytes, and the message length is 708 bytes. Next, the logical layer determines the transmit list drop threshold, based on drop priority or quality of service of the IMS message type. Next, the algorithm determines which interprocessor controller transmit service to use, either the high throughput or high reliability queues. Finally, the appropriate interprocessor communication transmit function for the destination slot based on the transmit service required is invoked. In this example, the command for transferring IMS data to the high throughput queue is called for the destination slot beginning with buffer descriptor BD-A with a quality of service threshold specified. The IOS driver located on the source processor, that is the central processor in this example, executes the transfer using its high throughput command list when the header for the command list reaches the appropriate entry in the command list.

On the receive side, the logical layer demultiplexes a batch of receive messages into sub-batches by individual IMS message type. A client receive function is called for the batch of received messages beginning with the buffer descriptor of the first buffer for the batch. In this case, it is buffer descriptor BD_P. Thus, a first buffer in the receiving device is loaded with 256 bytes, the first 8 bytes of which are the header, which can be discarded. Thus, the buffer descriptor includes a pointer to the next buffer BD-Q, a buffer length field and a buffer data address with an 8 byte offset to discard the header at address P+8. A buffer descriptor BD-Q points to the next buffer descriptor BD-R, stores the full 256 bytes at address Q. Buffer descriptor BD-R indicates that it is the last buffer in the batch by a null next field, has the balance of the data in it, beginning at buffer data address R. The demultiplexing occurs in response to the high throughput queue receive list, when the header for that list reaches the appropriate entry.

The IOS driver on the central processor adds entries to the transmit queue and updates the transmit tail pointer. Then it issues an event to the remote IOS which is to receive the data transfer. When the transmit head pointer is updated later on, the IOS driver frees up the transmit buffers from the last transmit head until the new transmit head pointer. On the receiving device, the central device driver queues up a DMA control block (DCB) which contains the source address, target address, length of the data to be copied, the data transfer type, and the status of the DMA transfer. The significant transfer bit is set in the DCB. The DCB is used to fetch the set up of the transfer from the central processor. When the DCB is complete, the transmit cache tail is updated to match the transmit tail pointer in the set up. Then one or more DCBs is queued up to copy newer entries in the transmit list to the end of the transmit cache list. When the transmit cache list in the central device driver on the remote processor is complete, the transmit cache tail pointer is updated. Next, a batch of transmit cache entries is processed to transfer data into receive buffers. A DCB is then queued for each contiguous data transfer. For each receive buffer, when the last DCB using an address from that buffer is enqueued, receive buffer and flag fields are sent to the receive list. Then, the transmit cache head pointer is updated to the next entry for processing. When the process completes, the transmit cache head pointer in the shared memory for the central processor is updated to match the transmit head in the cache on the local device. Next, a DCB is queued up to transmit the set up data from the IOS to shared memory, in the central processor.

FIG. 28 illustrates the process in reverse from the remote intelligent processor to the central processor. This system receives an lMS send buffer data command at the logical layer identifying the first buffer descriptor for the batch which makes up the message, the message type, and the destination. Thus, for all fragments in a batch, the message header is prepended, preceding the data buffer of the first segment at a desired data offset, and the buffer data address at the start of the IMS message header. This header indicates the message type as IMS data, and that the message header size is 8 bytes, the data offset within the message id 8 bytes, and the message length is 708 bytes. Next, the logical layer determines the transmit list drop threshold, based on drop priority or quality of service of the IMS message type. Finally, the transmit service to use is determined based on the message type, either high throughput or high reliability. Finally, the appropriate IPC transmit function is invoked for the destination slot based on the required transmit service. This results in a command indicating a high throughput transmit function indicating the destination, the source buffer, and the quality of service threshold. This message is added to the high throughput command list as shown with a first entry for buffer descriptor BD-P, a second entry for buffer descriptor BD-Q, and a third entry for buffer descriptor BD-R. On the receive side, the receive buffers are loaded by the hardware, and the logical layer demultiplexes a batch of received messages into sub-batches by individual IMS message type. The client receive function is invoked for each IMS message type received, and executed when the receive list head reaches the appropriate entry. Thus, the client receive function writes the incoming batches to buffer descriptor BD-A indicates that the next buffer descriptor buffer descriptor BD-B, and the buffer data length and the offset. Again, for 512 byte buffer the first 8 bytes are header which may be discarded. Thus, the buffer data address is 8 bytes past the beginning of buffer BD-A as indicated in the figure. Buffer descriptor BD-A points to buffer descriptor BD-B which stores the balance of the data at the address at the beginning at point B.

In the central device driver on the remote processor, a DCB is queued up with a bit set indicating a transfer across the IMS to the central system. The shared memory set up is fetched from the central system using this DCB. When this is completed, the receive cache tail in shared memory, and the receive status cache tail in shared memory pointers in the receive manager are set to manage the receive buffer tail pointer which was retrieved from the central processor. A DCB is queued up to copy newer entries in the receive buffer list in the central processor to the end of the receive buffer cache list in the remote processor. When the list has been updated, the receive buffer cache tail and receive status cache tail are updated. Then a batch of transmit entries are processed to transfer into the receive buffers listed in the receive buffer cache. A DCB is queued up for each contiguous data transfer. For each receive buffer, when the last DCB using an address from that buffer is en queued, status for the buffer is set in the receive status cache. Next, the receive status cache entry at the head pointer is triggered, and the next receive status cache entry is updated. Once the trigger DCB is completed, a DCB is queued up to copy the newer status cache entries to the central processor. Also the receive buffer cache pointers are updated to their trigger pointers, and the corresponding structures in shared memory are updated.

IV. EXTENSION TO LAN OR WAN BACKBONE

FIG. 29 illustrates an extension of the present invention to a system which replaces the high speed parallel bus of FIG. 1 with a local area network or wide area network backbone generally 2000. For instance, the backbone 2000 might be an ATM network coupled to a variety of local area networks using virtual circuits, such as discussed in the document published by the ATM Forum entitled *LAN Emulation Over ATM Specification—Version* 1.0. Thus, a plurality of input/output processors, such as IOP 2001, IOP 2002, and IOP 2003 are coupled using the interprocessor messaging systems IMS 2004 through IMS 2006 respectively. Using the backbone physical layer 2000, the IMS communicates among the IOPs using the message passing protocol as described above. Coupled to the WAN or LAN backbone 2000, is at least one router in the embodiment shown. A first router labeled Router A 2007 is coupled to the backbone through the interprocessor messaging system 2008. Also, a second router 2009 labeled Router B in the figure, is coupled to the backbone through the interprocessor messaging system 2010. Each of the input/output processors 2001 through 2003 and the routers 2007 and 2009 in the figure include a plurality of network connections which provide interfaces to networks which use the router resources distributed amongst the processors. More than one router can be included in the system. This way, the IOP processors 2001 through 2003 can contain some fault tolerance. For instance, if Router A is down, a processor may retry a given request to the router by sending it to Router B. A variety of protocols can be used to optimize performance of the system. For instance, the IOP might use Router A for a first transaction and Router B for a second transaction, and constantly change between routers. Alternatively, each IOP could be assigned a primary router which it relies upon, unless a catastrophic failure in the primary router occurs. In which case, its requests are redirected to the secondary router.

Because of the interprocessor messaging system based on the latency and reliability classes of the present invention, the scalable internetworking processes are achieved using the LAN or WAN backbone, which suffers lost packets from time to time. Data in transit is ensured to receive the best available throughput across the backbone 2000, while control messages and the like are given higher priority, and managed to ensure greater reliability than are the high throughput, data-in-transit messages. This way, the overhead associated with high reliability type messages is not extended to the data-in-transit, providing substantial improvements in overall system throughput across the backbone 2000.

V. CONCLUSION

Accordingly, the present invention provides a high performance family of bridge/routers which supplies transparent communication between all types of interfaces within a single chassis, integrating Token Ring, Ethernet, FDDI, ATM, and WAN links. The architecture of the present invention delivers the power of single or multiprocessor options, with a high speed backplane bus for consistently fast throughput across all interface ports.

These resources allow for selecting the most efficient path between any two locations, automatically re-routing around failures, solving broadcast and security problems, and establishing and administering organizational domains.

Thus, the scalable platform of the present invention provides for interconnection of a full function routing engine with a wide variety of input/output modules, including other full function engines, intelligent I/O modules which perform a subset of the routing decisions, and basic I/O modules which have no local routing capability and rely on the centralized full function routers for such decisions. All of these elements are interconnected by a high speed backplane bus utilized efficiently according to logical layer interconnections for the intelligent I/O processors, and physical layer interconnection for the basic I/O modules without processing facilities necessary for managing the logical links. Thus, the architecture of the present invention supports growing complexity of I/O modules, as well as basic single port connections that can be used for incremental growth, and backward compatibility in the systems.

Furthermore, according to the present invention, distributed processing systems, in which the processing nodes communicate across a communication link that utilizes a connectionless protocol are able to achieve greater control over the reliability and latency of messages being sent through the system. This greater control allows extension of the distributed processing environment to a wider variety of technological missions, which require high volumes of primary data traffic flow, interspersed with lower volumes of critical control messages and the like.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method of transferring data on a communication medium from a source processor to a destination processor, the data including messages of a first transmit latency class and messages of a second transmit latency class, comprising:

queuing messages of the first transmit latency class in the source processor according to a first transmit priority rule in a first transmit queue;

queuing messages of the second transmit latency class in the source processor according to a second transmit priority rule in a second transmit queue; and sending a particular message selected from the first and second transmit queues in the source processor according to a queue priority rule to the destination processor without establishing connection with the destination processor for the particular message in advance of sending the particular message.

2. The method of claim 1, wherein the queue priority rule provides for sending messages in the second transmit queue prior to sending any message in the first transmit queue, so long as a message resides in the second transmit queue.

3. The method of claim 1, wherein the first transmit priority rule comprises a first-in-first-out rule.

4. The method of claim 1, wherein the second transmit priority rule comprises a first-in-first-out rule.

5. The method of claim 1, wherein the step of queuing messages of the first transmit latency class includes:

storing commands in the first transmit queue, the commands identifying the messages to be transferred across the medium, wherein the step of sending includes executing the commands.

6. The method of claim 5, wherein messages of the first transmit latency class include one or more fragments of data, the fragments of data being stored in the source processor in identified locations, and the step of storing commands includes storing a command in the first transmit queue for each fragment of a message.

7. The method of claim 5, wherein the commands include:

pointers to memory locations in the source processor where the messages to be transferred are stored, and destinations addresses for the messages to be transferred.

8. The method of claim 1, wherein messages of the first transmit latency class include one or more cells of data, the cells of data having a data length specified according to characteristics of the communication medium, and the step of sending includes segmentation of messages into cells.

9. The method of claim 1, wherein the messages include:

pointers to memory locations in the source processor where the messages to be transferred are stored, and destinations addresses for the messages to be transferred.

10. The method of claim 1, including:

receiving at the destination processor messages addressed to the destination processor; and storing the received messages in destination processor memory according to a receive priority rule, the receive priority rule providing for storing messages of a first reliability class if a first threshold amount of storage is available in destination processor memory, and storing messages of a second reliability class if a second threshold amount of storage is available in destination processor memory, wherein the first threshold is larger than the second threshold.

11. The method of claim 10, including:

providing a plurality of receive buffers in destination processor memory;

maintaining a list of free receive buffers; and wherein the step of storing includes loading at least a portion of a received message into a free receive buffer identified by the list of free receive buffers; and wherein the receive priority rule includes dropping messages of the first reliability class if the list of free receive buffers indicates that less than the first threshold amount of storage is available in the receive buffers.

12. The method of claim 11, wherein the receive priority rule includes dropping messages of the second reliability class if the list of free receive buffers indicates that less than the second threshold amount of storage is available in the receive buffers.

13. The method of claim 12, wherein the receive priority rule includes dropping messages of a third reliability class, if the list of free receive buffers indicates that no storage is available in the receive buffers.

14. The method of claim 12, wherein the first receive priority rule comprises a first-in-first-out rule.

15. The method of claim 12, wherein the second receive priority rule comprises a first-in-first-out rule.

16. The method of claim 1, including:

providing in the source processor, a code in messages being transmitted which indicates one of first and second reliability classes;

receiving at the destination processor messages addressed to the destination processor; and storing the received messages in destination processor memory according to a receive priority rule, the receive priority rule providing for storing messages of the first reliability class if a first threshold amount of storage is available in destination processor memory, and storing messages of the second reliability class if a second threshold amount of storage is available in destination processor memory, wherein the first threshold is larger than the second threshold.

17. The method of claim 1, including:
providing in the source processor, a code in messages being transmitted which indicates one of first and second receive latency classes;
receiving messages in a destination processor;
queuing messages of the first receive latency class for handling at the destination processor according to a first receive priority rule in a first receive queue;
queuing messages of the second receive latency class for handling at the destination processor according to a second receive priority rule in a second receive queue; and
processing messages in the first and second receive queues at the destination processor according to a receive queue priority rule.

18. The method of claim 17, wherein the receive queue priority rule provides for processing messages in the second receive queue prior to processing any message in the first receive queue, so long as a message resides in the second receive queue.

19. The method of claim 1, wherein the communication medium comprises a bus, and the step of sending includes transferring messages across the bus in a burst mode transfer.

20. The method of claim 1, wherein the communications medium comprises a local area network.

21. The method of claim 1, wherein the communications medium comprises a wide area network.

22. The method of claim 1, wherein there are a plurality of types of messages, and wherein said first transmit queue has a limited size, and wherein said step of queuing messages of the first transmit latency class includes dropping messages of a first type, if less than a first threshold number of entries is available in the first transmit queue.

23. A method of transferring data on a communication medium from a source processor to a destination processor, the data including messages of a first reliability class and messages of a second reliability class, comprising:
providing in the source processor, a code in messages being transmitted which indicates one of the first and second reliability classes;
sending a particular message from the source processor to the destination processor without establishing connection with the destination processor for the particular message in advance of sending the particular message;
receiving at the destination processor messages addressed to the destination processor; and
storing the received messages in destination processor memory according to a receive priority rule, the receive priority rule providing for storing messages of the first reliability class if a first threshold amount of storage is available in destination processor memory, and storing messages of the second reliability class if a second threshold amount of storage is available in destination processor memory, wherein the first threshold is larger than the second threshold.

24. The method of claim 23, including:
providing in the source processor, a code in messages being transmitted which indicates one of a first and second receive latency classes;

receiving messages in a destination processor;
queuing messages of the first receive latency class for handling at the destination processor according to a first receive priority rule in a first receive queue;
queuing messages of the second receive latency class for handling at the destination processor according to a second receive priority rule in a second receive queue; and
processing messages in the first and second receive queues at the destination processor according to a receive queue priority rule.

25. The method of claim 24, wherein the receive queue priority rule provides for processing messages in the second receive queue prior to processing any message in the first receive queue, so long as a message resides in the second receive queue.

26. The method of claim 24, wherein the first receive priority rule comprises a first-in-first-out rule.

27. The method of claim 24, wherein the second receive priority rule comprises a first-in-first-out rule.

28. The method of claim 23, wherein the communication medium comprises a bus, and the step of sending includes transferring messages across the bus in a burst mode transfer.

29. The method of claim 23, wherein the communications medium comprises a local area network.

30. The method of claim 23, wherein the communications medium comprises a wide area network.

31. The method of claim 23, including:
providing a plurality of receive buffers in destination processor memory;
maintaining a list of free receive buffers available for the step of storing;
and wherein the receive priority rule includes dropping messages of the first reliability class if the list of free receive buffers indicates that less than the first threshold amount of storage is available in the receive buffers.

32. The method of claim 31, wherein the receive priority rule includes dropping messages of the second reliability class if the list of free receive buffers indicates that less than the second threshold amount of storage is available in the receive buffers.

33. The method of claim 32, wherein the data includes messages of a third reliability class, and the receive priority rule includes dropping messages of a third reliability class if no free receive buffers are available in the receive buffers.

34. A method of transferring data on a communication medium from a source processor to a destination processor, the data including messages of a first latency class and messages of a second latency class, comprising:
providing in the source processor, a code in messages being transmitted which indicates one of a first and second receive latency classes;
sending a particular message from the source processor to the destination processor without establishing connection with the destination processor for the particular message in advance of sending the particular message;
receiving at the destination processor messages addressed to the destination processor;
queuing messages of the first receive latency class for handling at the destination processor according to a first receive priority rule in a first receive queue;
queuing messages of the second receive latency class for handling at the destination processor according to a second receive priority rule in a second receive queue; and processing messages in the first and second receive queues at the destination processor according to a receive queue priority rule.

35. The method of claim 34, wherein the receive queue priority rule provides for processing messages in the second receive queue prior to processing any message in the first receive queue, so long as a message resides in the second receive queue.

36. The method of claim 34, wherein the first receive priority rule comprises a first-in-first-out rule.

37. The method of claim 34, wherein the second receive priority rule comprises a first-in-first-out rule.

38. The method of claim 34, wherein the communication medium comprises a bus, and the step of sending includes transferring messages across the bus in a burst mode transfer.

39. The method of claim 34, wherein the communications medium comprises a local area network.

40. The method of claim 34, wherein the communications medium comprises a wide area network.

41. In a system including a plurality of processors, processors in the plurality having one or more input/output ports coupled to data networks, a method of transferring a plurality of types of messages on a communication medium among the plurality of processors, comprising:

receiving a frame of data from an input/output port on a source processor;

executing a frame transfer process on the source processor to route the frame of data to a destination processor in the plurality of processors, the frame transfer process including generating control and data transfer messages to be transferred among the plurality of processors;

classifying the control and data transfer messages in the source processor according to a transmit latency class and a receive reliability class;

queuing, in response to the frame transfer process, messages of a first transmit latency class in a source processor according to a first transmit priority rule in a first transmit queue;

queuing, in response to the frame transfer process, messages of a second transmit latency class in the source processor according to a second transmit priority rule in a second transmit queue;

sending specific messages selected from the first and second transmit queues in the source processor according to a queue priority rule to the destination processor without establishing that the destination processor has available resources to receive a specific message in advance of sending the specific message;

receiving at the destination processor messages addressed to the destination processor; determining at the destination processor the reliability class of received messages;

storing the received messages in destination processor memory according to a receive priority rule, the receive priority rule providing for dropping messages of a first reliability class if less than a first threshold amount of storage is available in destination processor memory; and executing a process in the destination processor using the stored messages.

42. The method of claim 41, including:

providing a plurality of receive buffers in destination processor memory;

maintaining a list of free receive buffers available for the step of storing;

and wherein the receive priority rule includes dropping messages of the and wherein the receive priority rule includes dropping messages of the first reliability class if the list of free receive buffers indicates that less than the first threshold amount of storage is available in the receive buffers.

43. The method of claim 41, wherein the step of storing received messages includes dropping messages of a second reliability class if less than a second threshold amount of storage is available in destination processor memory.

44. The method of claim 41, wherein the step of queuing messages of the first type includes:

storing commands the first transmit queue, the commands identifying the messages to be transferred across the medium, wherein the step of sending includes executing the commands.

45. The method of claim 44, wherein at least some data transfer messages include one or more fragments of data, the fragments of data being stored in the source processor in identified locations, and the step of storing commands includes storing a command in the first transmit queue for each fragment of a message.

46. The method of claim 45, wherein the commands include:

pointers to memory locations in the source processor where the messages to be transferred are stored, and destinations addresses for the messages to be transferred.

47. The method of claim 45, wherein the communication medium comprises a bus, and the step of sending includes transferring messages of the first type across the bus in a burst mode transfer.

48. The method of claim 41, including:

providing in the source processor, a code in messages being transmitted which indicates one of a plurality of receive latency classes;

queuing messages of a first receive latency class for handling at the destination processor according to a first receive priority rule in a first receive queue;

queuing messages of a second receive latency class for handling at the destination processor according to a second receive priority rule in a second receive queue; and processing messages in the first and second receive queues at the destination processor according to a receive queue priority rule.

49. The method of claim 48, wherein the receive queue priority rule provides for processing messages in the second receive queue prior to processing any message in the first receive queue, so long as a message resides in the second receive queue.

50. The method of claim 49, wherein the first receive priority rule comprises a first-in-first-out rule.

51. The method of claim 49, wherein the second receive priority rule comprises a first-in-first-out rule.

52. The method of claim 41, wherein the communication medium comprises a bus, and the step of sending includes transferring messages across the bus in a burst mode transfer.

53. The method of claim 41, wherein the communications medium comprises a local area network.

54. The method of claim 41, wherein the communications medium comprises a wide area network.

55. The method of claim 41, wherein there are a plurality of types of messages, and wherein said first transmit queue has a limited size, and wherein said step of queuing messages of the first transmit latency class includes dropping messages of a first type, if less than a first threshold number of entries is available in the first transmit queue.

56. A method of transferring data on a communication medium from a source processor to a destination processor, the data including messages of a first transmit latency class and messages of a second transmit latency class, comprising:

queuing messages of the first transmit latency class in the source processor according to a first transmit priority rule in a first transmit queue;

queuing messages of the second transmit latency lass in the source processor according to a second transmit priority rule in a second transmit queue; and sending a particular message selected from the first and second transmit queues in the source processor according to a queue priority rule to the destination processor without establishing connection with the destination processor for the particular message in advance of sending the particular message;

receiving at the destination processor messages addressed to the destination processor; and storing the received messages in destination processor memory according to a receive priority rule, the receive priority rule providing for storing messages of a first reliability class if a first threshold amount of storage is available in destination processor memory, and storing messages of a second reliability class if a second threshold amount of storage is available in destination processor memory, wherein the first threshold is larger than the second threshold, and wherein the receive priority rule includes dropping messages of the second reliability class if than the second threshold amount of storage is available in the destination processor memory.

57. The method of claim 56, wherein the receive priority rule includes dropping messages of a third reliability class, if no storage available in the destination processor memory.

* * * * *